(12) United States Patent
Gleixner et al.

(10) Patent No.: US 9,210,645 B2
(45) Date of Patent: Dec. 8, 2015

(54) METHOD FOR DYNAMICALLY CONTROLLING DATA PATHS, MTC GATEWAY AND NETWORK DEVICE USING THE SAME

(75) Inventors: Stephan Gleixner, Hsinchu County (TW); Jen-Shun Yang, Hsinchu County (TW)

(73) Assignee: Industrial Technology Reseach Institute, Hsinchu (TW)

( * ) Notice: Subject to any disclaimer, the term of this patent is extended or adjusted under 35 U.S.C. 154(b) by 812 days.

(21) Appl. No.: 13/474,728

(22) Filed: May 18, 2012

(65) Prior Publication Data

US 2013/0311640 A1 Nov. 21, 2013

(51) Int. Cl.
| | | |
|---|---|---|
| G06F 15/173 | (2006.01) | |
| H04W 40/24 | (2009.01) | |
| H04W 76/02 | (2009.01) | |
| H04L 29/06 | (2006.01) | |
| H04L 12/715 | (2013.01) | |
| H04W 4/00 | (2009.01) | |

(52) U.S. Cl.
CPC ............. *H04W 40/246* (2013.01); *H04L 45/04* (2013.01); *H04L 65/103* (2013.01); *H04W 4/001* (2013.01); *H04W 4/005* (2013.01); *H04W 76/02* (2013.01)

(58) Field of Classification Search
USPC ........................................................ 709/224
See application file for complete search history.

(56) References Cited

U.S. PATENT DOCUMENTS

| | | | |
|---|---|---|---|
| 5,574,950 A | | 11/1996 | Hathorn et al. |
| 7,558,254 B2 | | 7/2009 | Haase et al. |
| 7,979,062 B2 | * | 7/2011 | Cotevino et al. ............... 455/418 |
| 8,050,193 B2 | * | 11/2011 | Accetta et al. ................. 370/254 |
| 8,125,892 B1 | | 2/2012 | Jokimies et al. |
| 2006/0245452 A1 | | 11/2006 | Frederiksen et al. |
| 2008/0298377 A1 | * | 12/2008 | Amour et al. .................. 370/400 |
| 2009/0268712 A1 | * | 10/2009 | Bottiero et al. ................ 370/352 |
| 2010/0003980 A1 | | 1/2010 | Rune et al. |

(Continued)

FOREIGN PATENT DOCUMENTS

| | | |
|---|---|---|
| WO | 2009134183 | 11/2009 |
| WO | 2010037422 | 4/2010 |

(Continued)

OTHER PUBLICATIONS

3GPP, "3rd Generation Partnership Project; Technical Specification Group Services and Systems Aspects; Study on Enhancements for MTC; (Release 11)," 3GPP TR 22.888 V0.7.0, May 2012, pp. 1-20.

(Continued)

*Primary Examiner* — Richard G Keehn
(74) *Attorney, Agent, or Firm* — Jianq Chyun IP Office

(57) ABSTRACT

Method for dynamically controlling data paths of Machine-type-communication (MTC) local access device(s) are proposed along with a MTC gateway and a network device using the same method. In one embodiment, the proposed method may include following: a network device, receiving and storing capillary network information and MTC gateway interconnection information from at least one MTC server; combining the access network information with the capillary network information and the MTC gateway interconnection information to build an aggregated topology map; generating enhanced policy rules according to the aggregated topology map related to at least one capillary network; and respectively transmitting the enhanced policy rules to the interconnected MTC gateways.

21 Claims, 20 Drawing Sheets

(56) References Cited

U.S. PATENT DOCUMENTS

| | | |
|---|---|---|
| 2010/0303009 A1 | 12/2010 | Liu |
| 2013/0073746 A1* | 3/2013 | Singh et al. .......... 709/248 |
| 2014/0301328 A1* | 10/2014 | Yacovitch .......... 370/329 |

FOREIGN PATENT DOCUMENTS

| | | |
|---|---|---|
| WO | 2010080966 | 7/2010 |
| WO | 2011026867 | 3/2011 |
| WO | 2011087223 | 7/2011 |

OTHER PUBLICATIONS

3GPP, "3rd Generation Partnership Project; Technical Specification Group Services and Systems Aspects; System Improvements for Machine-Type Communications (Release 11)," 3GPP TR 22.888 V1.6.1, Mar. 2012, pp. 1-165.

"Office Action of European Counterpart Application", issued on Mar. 3, 2014, p. 1-p. 8.

"Office Action of Taiwan Counterpart Application", issued on Jan. 20, 2014, p. 1-p. 5.

* cited by examiner

METHOD FOR DYNAMICALLY CONTROLLING DATA PATHS, MTC GATEWAY AND NETWORK DEVICE USING THE SAME

BACKGROUND

1. Technical Field

The disclosure generally relates to a method for dynamically controlling data paths (of Machine-type-communication (MTC) local access device(s)), which may be applied to MTC networks.

2. Related Art

Machine-type-communication (abbreviated as MTC) or Machine to Machine communications (M2M) can enable information exchange between a subscriber station (or a wireless communication device) and a server in the core network (through a base station) or just between subscriber stations, which may be carried out without any human interaction.

MTC application may use sensor devices that capture certain events such as temperature, and gas or water consumption and then transmit the captured information over a wired network, a wireless network or a hybrid of wired and wireless network to an MTC application (residing at a MTC server). For example, smart meters with metering application could be expected to be one among the early MTC devices deployed. Many other MTC devices such as e-health monitors are envisioned and are expected to be widely used in the near future.

For another example, Third Generation Partnership Project (3GPP) establishes common and specific service requirements including MTC communication scenarios. According to the 3GPP framework, MTC devices may communicate directly with one or more MTC server(s) (which may or may not be controlled by the mobile network operator). In another communication scenario, so-called local-access devices without 3GPP mobile communication capability may be located in a MTC capillary network which provides local connectivity between the local-access devices within its coverage and a MTC gateway device. The MTC gateway device could be a MTC device which acts as a gateway for local-access devices in a MTC capillary network to communicate through a PLMN with one or more MTC server(s).

It may be envisioned that several MTC gateways are interconnected by means of wireless (such as IEEE 802.11 WLAN/Wi-Fi) or wire-line (such as Ethernet (wired LAN) or broadband PLC) technologies. For instance, MTC gateways without any interconnections to other MTC gateways may be considered as single point of failure. If one MTC gateway failed, the whole capillary network would be cut-off from MTC communication with the MTC server. On the other hand, when capillary networks are deployed in an interconnected fashion, hot stand-by mechanism may be in place which would provide improved service quality and potentially higher revenues.

However, it is required to populate IP stack routing tables of the interconnected MTC gateways for the situation that several MTC gateways are interconnected and such interconnection may allow a local-access device use a MTC gateway which does not provide coverage for the area where the local-access device is located. Further, it could also be desirable to have policies in place per service data flow to describe, for instance, that a certain service data flow might use WLAN access during a first scheduled period and evolved universal terrestrial radio access network (E-UTRAN) access during a second scheduled period.

Routing table and policy updates may be statically pre-configured by the mobile network operator (MNO) or dynamically configured by the MNO via the Access Network Discovery and Selection Function (ANDSF), which is a network device specified in 3GPP standard. However, the aforementioned implementations currently have some difficulties especially for the situation that MTC service provider and MNO are different organizational entities.

For the statically pre-configured implementation, the MTC service provider could allow the MNO to access the MTC gateways to pre-configure them accordingly. However, it may not be always desired by the MTC service provider to give the MNO access to its assets. Alternatively, the MTC service provider could request certain information from the MNO to pre-configure the MTC gateways himself. However, it may not be always desired by the MNO to provide this kind information.

As with the statically pre-configuration implementation there are issues also for the dynamic implementation when the MTC service provider and the MNO are different organizational entities. In particular, the MNO is unaware of specific information regarding the MTC gateways. For instance, the MNO may not be aware whether MTC gateways are interconnected or not. Even if the MTC gateways are interconnected, the MNO may not be aware of the interconnection network characteristics (described for instance by bandwidth, latency, jitter, loss, and so forth).

The current state of the art does not address the issue of interconnected MTC gateways, populating routing tables and conduction policy updates of MTC gateways, and does not provide an implementation to enable the ANDSF to perform a task with information from a domain outside of the mobile network operator domain. Therefore, it may be important for the wireless communication industry to research and develop an effective routing implementation for interconnected MTC gateways (and its corresponding capillary network(s)) in a MTC network.

SUMMARY

A method for dynamically controlling data paths is introduced herein. According to an exemplary embodiment, the method for dynamically controlling data paths is adapted to MTC networks comprising local-access devices located in MTC capillary networks, interconnected MTC gateways, at least one MTC server and a network device in a mobile network operator domain, the method includes following: the network device receiving capillary network information and MTC gateway interconnection information either directly over a control plane from the at least one MTC server, or indirectly receiving the capillary network information and the MTC gateway interconnection information transmitted from the at least one MTC server to the MTC gateway over a user plane and then from the MTC gateway to the network device over a S14 control plane; the network device storing the capillary network information and the MTC gateway interconnection information; the network device receiving access network information from the mobile network operator domain; the network device combining the access network information with the capillary network information and the MTC gateway interconnection information to build an aggregated topology map; the network device processing the aggregated topology map related to the MTC capillary networks, and then generating enhanced policy rules; and the network device respectively transmitting the enhanced policy rules to the interconnected MTC gateways.

A method for dynamically controlling data paths is introduced herein. According to an exemplary embodiment, the method for dynamically controlling data paths is adapted to a machine-type-communication (MTC) network comprising local-access devices located in MTC capillary network, interconnected MTC gateways, at least one MTC server and a network device in a mobile network operator domain. The method may include following: the at least one MTC server transmitting capillary network information and MTC gateway interconnection information over a user plane to the interconnected MTC gateways; and then transmitting the capillary network information and the MTC gateway interconnection information from the MTC gateway to the network device over a S14 control plane.

A method for dynamically controlling data paths is introduced herein. According to an exemplary embodiment, the method for dynamically controlling data paths is adapted to a machine-type-communication (MTC) server in a MTC network comprising local-access devices located in MTC capillary networks, interconnected MTC gateways, at least one MTC server and a network device in a mobile network operator domain. The method may include following: the at least one MTC gateway receiving enhanced policy rules from the network device, wherein the enhanced policy rules are related to data flows of at least one MTC device in a capillary network in which the MTC gateway is disposed; the at least one MTC server storing the enhanced policy rules; and the at least one MTC server updating its routing table in accordance with the enhanced policy rules.

A method for dynamically controlling data paths is introduced herein. According to an exemplary embodiment, the method for dynamically controlling data paths is adapted to a machine-type-communication (MTC) server in a MTC network comprising local-access devices located in MTC capillary networks, interconnected MTC gateways, at least one MTC server and a network device in a mobile network operator domain. The method may include following: the at least one MTC server provisioning capillary network information and MTC gateway interconnection information to a mobile network operator entity over a control plane; and the mobile network operator entity transmitting the capillary network information and the MTC gateway interconnection information to the network device over the control plane.

Several exemplary embodiments accompanied with figures are described in detail below to further describe the disclosure in details.

BRIEF DESCRIPTION OF DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
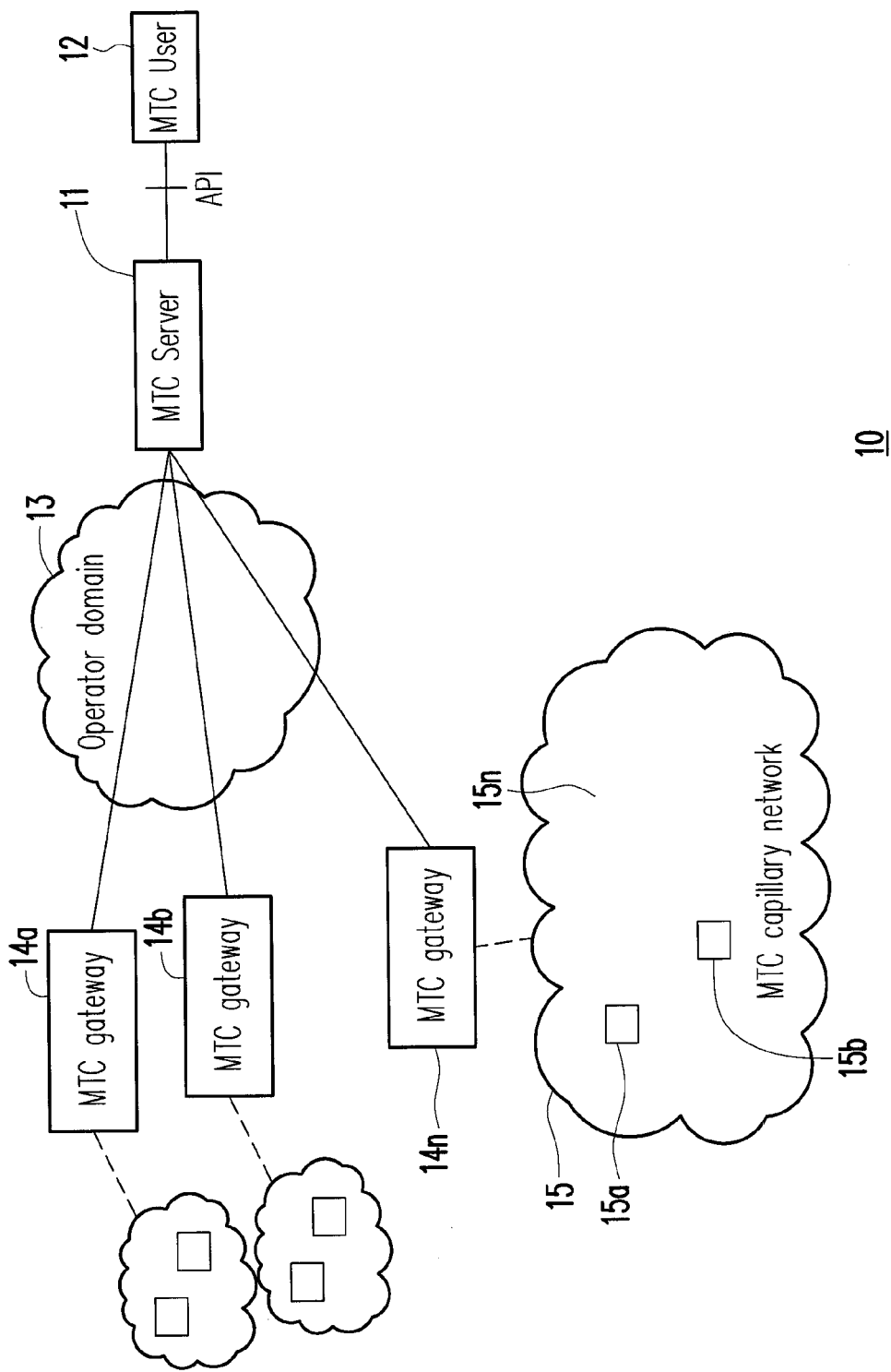
FIG. 1 illustrates system architecture of a MTC network.

Some embodiments of the present application will now be described more fully hereinafter with reference to the accompanying drawings, in which some, but not all embodiments of the application are shown. Indeed, various embodiments of the application may be embodied in many different forms and should not be construed as limited to the embodiments set forth herein; rather, these embodiments are provided so that this disclosure will satisfy applicable legal requirements. Like reference numerals refer to like elements throughout.

Throughout the disclosure, a MTC local access device in a MTC capillary network may refer to a wireless terminal communication device, an M2M device, a MTC device, and so forth. The MTC device may be, for example, a digital television, a digital set-top box, a personal computer, a notebook PC, a tablet PC, a netbook PC, a mobile phone, a smart phone, a water meter, a gas meter, an electricity meter, an emergency alarm device, a sensor device, a video camera, and so forth. Also, the base station (BS) may refer to an advanced base station, a node B, an enhanced node B (eNB), and so forth.

FIG. 1 illustrates system architecture of a MTC network. Referring to FIG. 1, a MTC network 10 may include at least one MTC server 11, at least one MTC user 12, an operator domain 13 (may also be referred to a mobile network operator domain) consisting of a core network and an access network, and a plurality of MTC gateways 14a, 14b, . . . , 14n. The MTC server 11 and the MTC user 12 could be connected to each other via a communication network and an application program interface (API). In the present embodiment, the MTC server 11 is disposed outside the operator domain 13, and may also be disposed in the Internet (and may be outside the operator domain 13) and could be connected to the MTC gateways 14a, 14b, . . . , 14n via the operator domain 13 or through other communication links or communication networks (which may be using radio access technology different from that of the operator domain 13). However, the present disclosure is not limited thereto; and, in other embodiments, the MTC server 11 may be disposed in the operator domain 13.

Referring to FIG. 1, each of the MTC gateways 14a, 14b, . . . , 14n may support more than at least two communication protocols at the same time, and could be connected to the operator domain 13 and a local wireless communication network respectively. The local wireless communication network may support IEEE 802.11 standard, IEEE 802.15.4 standard, WiFi standard, bluetooth standard, or ZigBee wireless communication protocol standard (abbreviated as ZigBee hereinafter). The operator domain 13 may be a wired communication network or wireless communication network supporting MTC communication between MTC server 11 and MTC local-access devices of the M2M gateways 14a, 14b, . . . , 14n. In general, the operator domain 13 may include a core network and an access network.

When the operator domain 13 is the wireless communication network, the operator domain 13 may support, for example, 3GPP LTE wireless communication standard, IEEE 802.16 standard, or other wireless communication standards. Each of the MTC gateways 14a, 14b, . . . , 14n respectively provide local radio access to corresponding MTC capillary networks, which include MTC nodes (or MTC devices). For example, the MTC gateway 14n could be connected to a plurality of MTC devices 15a, 15b, . . . , 15n. The MTC devices 15a, 15b, . . . , 15n could be connected to the MTC server 11 via the MTC gateway 14n serving as an agent and the 13, and thus transmit captured data to the MTC server 11, or receive an instruction message from the MTC server 11. The MTC user 12 may access data of the MTC devices 15a, 15b, . . . , 15n via the MTC server 11. However, the MTC devices 15a, 15b, . . . , 15n may also be connected to the MTC server 11 through other communication links (not shown in FIG. 1) or communication networks (not shown in FIG. 1) instead of the MTC gateway 14n or the operator domain 13.

Figure 2:
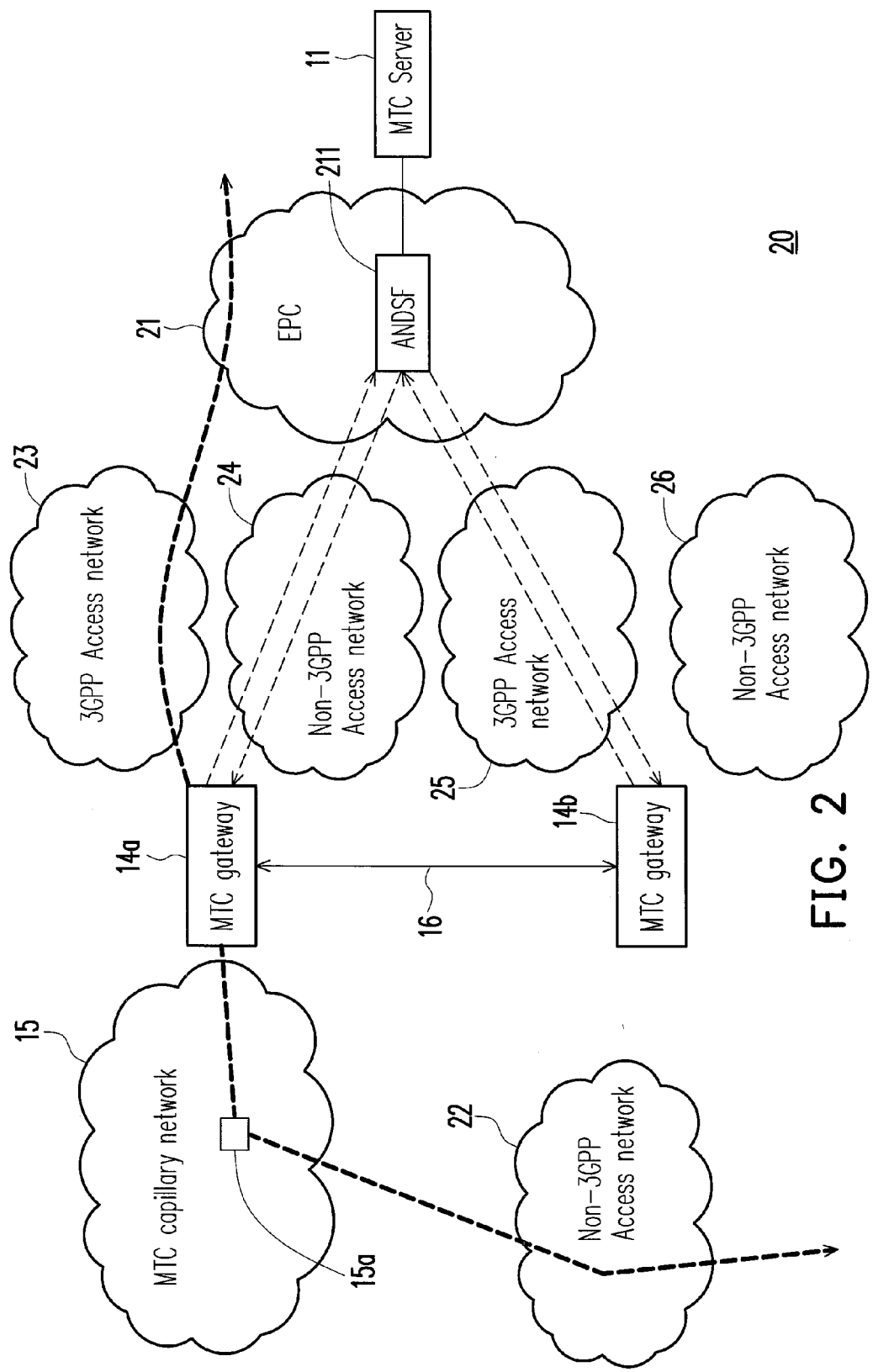
FIG. 2 illustrates system architecture of a MTC network according to an exemplary embodiment.

FIG. 2 illustrates system architecture of a MTC network according to an exemplary embodiment. Referring to FIG. 2, a MTC network 20 may include at least a MTC server 11, at least a evolved packet core (EPC) 21, at least two MTC gateways 14a, 14b, a non-3GPP access network 22, a 3GPP access network 23, a non-3GPP access network 24, a 3GPP access network 25, a non-3GPP access network 26 and at least one MTC capillary network 15. In the MTC network 20, the MTC server 11 is disposed outside the EPC 21, and the EPC 21 may include a network device such as Access Network Discovery and Selection Function (ANDSF) 211. In principle, as specified in 3GPP specification, the ANDSF 211 may control and select routing paths for each of the user equipment (UE) which currently is served by the EPC 21. In general, a mobile network includes an access network and a core network, where the ANDSF is located in the core network. The MTC gateway 14a may be communicating with the ANDSF 21 via the non-3GPP access network 24; on the other hand, the MTC gateway 14b may be communicating with the ANDSF 211 via the 3GPP access network 25. Additionally, the MTC gateway 14a and the MTC gateway 14b have a direct communication 16 (which may be called proximity communication) between them, and the direct communication 16 may be performed without passing through the EPC 21, the 3GPP access networks 23, 25, and the non-3GPP access networks 24, 26.

However, a MTC local access device 15a in the MTC capillary network 15 may be communicating with the MTC server 11 via many different routes. For example, the MTC local access device 15a may be communicating with the MTC sever 11 through the MTC gateway 14a, and the non-3GPP access network 24. For another example, the MTC local access device 15a may be communicating with the MTC sever 11 through the MTC gateway 14a, and the 3GPP access network 23 (which may be connected to the MTC server 11 via Internet). Also, for another example, the MTC local access device 15a may be communicating with the MTC sever 11 through the non-3GPP access network 22 (which may be connected to the MTC server 11 via Internet).

Further, for another example, the MTC local access device 15a may be communicating with the MTC sever 11 through the MTC gateway 14a, the direct communication 16, the MTC gateway 14b, and the 3GPP access network 25. Alternatively, the MTC local access device 15a may be communicating with the MTC sever 11 through the MTC gateway 14a, the direct communication 16, the MTC gateway 14b, and the non-3GPP access network 26 (which may be connected to the EPC 21 via Internet). The aforementioned communication links between the MTC server 11 and the MTC local access device 15a in the MTC network 20 are merely exemplary data flow paths but are not intended to limit the present disclosure.

In the present embodiment, the lines from the MTC gateways to the ANDSF 211 may refer to transmission of information regarding types of MTC traffic, MTC traffic volume, file size and so like. For example the transmission of information regarding types of MTC traffic, MTC traffic volume, file size and so like may be sent over S14 interface between the MTC gateways to the ANDSF 211. On the other hand, the lines form the ANDSF 211 to the MTC gateways may refer to transmission of policy rules.

Figure 3:
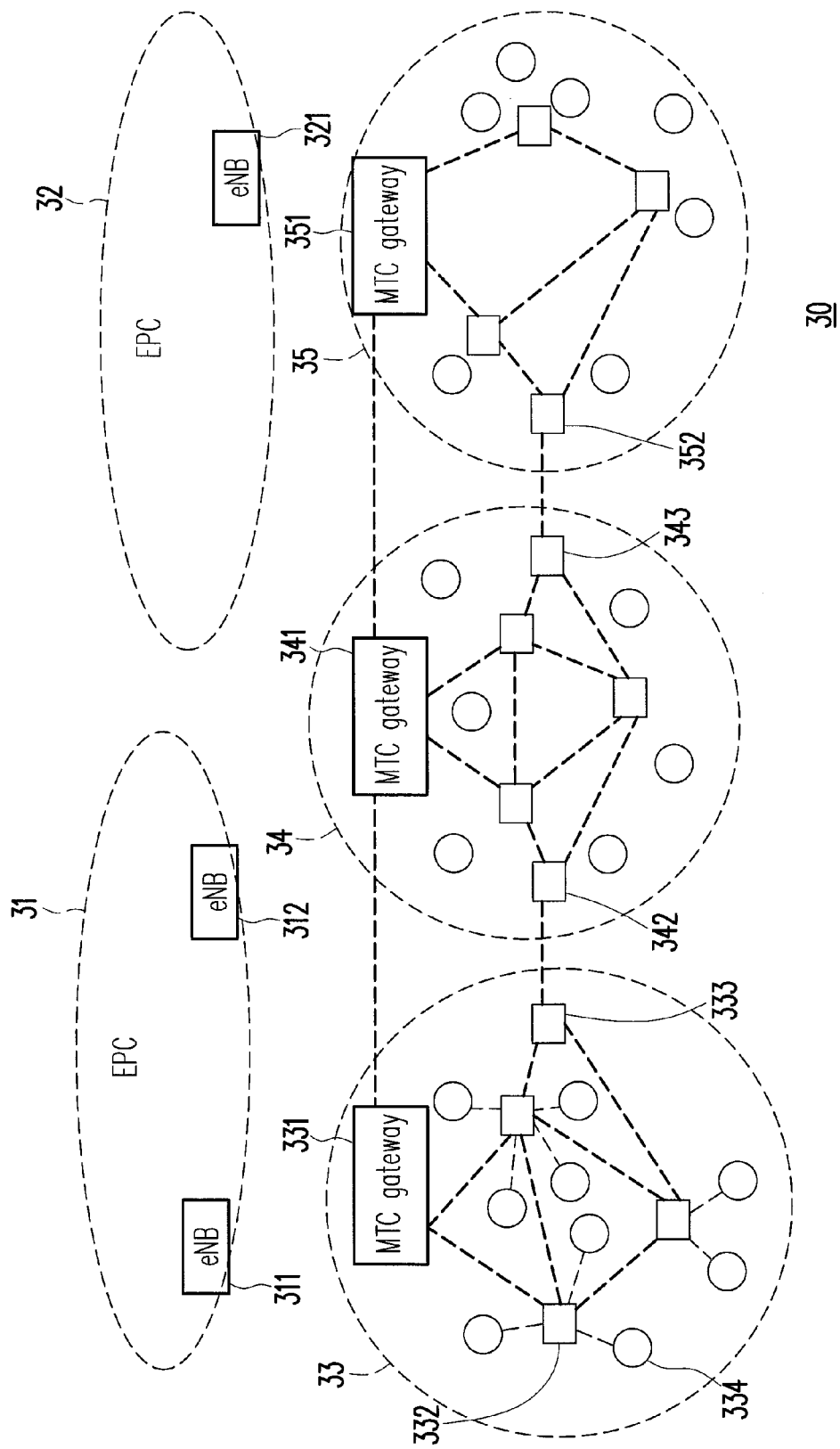
FIG. 3 illustrates system architecture of a MTC network according to another exemplary embodiment.

FIG. 3 illustrates system architecture of a MTC network according to another exemplary embodiment. Referring to FIG. 3, a MTC network 30 may include at least one EPC 31, 32, at least one MTC gateway 331, 341, 351 with their respective capillary networks 33, 34, 35. The EPC 31 may include at least two eNBs 311, 312 and its ANDSF (not shown in FIG. 3) and is connected to a MTC server. Similarly, the EPC 32 may include at least one eNBs 321 and the ANDSF (not shown in FIG. 3) and is connected to the same MTC server. In the present embodiment, some MTC gateways may be attached to one operator (such as MTC gateways 331, 341), while other MTC gateways may be attached to another operator (such as MTC gateway 351). If one operator (such as the operator of the EPC 31) experiences operational problems, due to the deployment of the interconnected MTC gateways 331, 341, 351, the MTC gateways originally attached to the EPC 31 may still use the network of the EPC 32.

On the capillary networks side, the capillary networks all include a plurality of non-3GPP local-access devices. For example, the non-3GPP local-access devices may be MTC local-access devices 332, 333, 334 in the capillary network 33; the MTC local-access devices 342, 343 in the capillary network 34; MTC local-access devices 332, 333, 334 in the capillary network 33; the MTC local-access devices 352 in the capillary network 35. There is direct communications between the MTC gateways 331, 341 or between the MTC gateways 341, 351. In the present embodiment, there may be bridging communication between the capillary networks, which may make the overall MTC network system more robust. For example, the MTC local-access devices 333, 342 may support ZigBee communication standard, and both may be ZigBee border gateway, which may be configured to connect the capillary networks 33, 34. Similarly, for another example, the MTC local-access devices 343, 352 may be ZigBee border gateway configured to connect the capillary networks 34, 35.

In the MTC network 30, a MTC local access device 334 may be, for example, communicating with the MTC server through the MTC local access device 332, the MTC gateway 331, and the eNB 311. For another example, the MTC local access device 334 may be communicating with the MTC server through the MTC local-access devices 332, 333, 342, the MTC gateway 341, and the eNB 312. Also, for another example, the MTC local access device 334 may be communicating with the MTC server through the MTC local-access devices 332, 333, 342, 343, the MTC gateway 351, and the eNB 321. The aforementioned communication links between the MTC server and the MTC local access device 334 in the MTC network 30 are merely exemplary data flow paths but are not intended to limit the present disclosure.

In the conventional art, for example, the ANDSF 21 in the MTC network 20 could merely control data flow paths of the MTC local-access devices within its corresponding 3GPP access network (such as the operator domain 13) since the ANDSF 21 only obtain topology information and loading of eNBs within its corresponding 3GPP access network. In the conventional art, the ADNSF in the MTC network 30 could not control data flow paths of the MTC local-access devices over direct communications between the MTC gateways or control data flow paths of the MTC local-access devices passing through neighbouring capillary network(s).

To be illustrated more clearly, the mobile network operator (MNO), which controls the ANDSF in the access network, is not aware of specific information of the MTC service provider domain. Here, the MTC service provider domain may refer to the MTC gateways and its associated capillary networks. This situation occurs in a typical MTC scenario where MTC service provider and mobile network operator are separate organizations. That also means that the MNO is not able to control data flows across interconnected MTC gateways (for example, through direct communications between the MTG gateways) via policy rules in a dynamic manner. Thus, the present disclosure provides a method for dynamically control data flows of a MTC network, which may enable the MNO(s) at least be aware of MTC gateway interconnection topology and interconnection network characteristics (such as bandwidth, latency, jitter, loss, and so like). Further, awareness of other properties at the ANDSF controlled by the MNO(s), for instance, user scheduled peak traffic loads or so like could also give MNO greater control over routing/controlling of data flows (of the MTC local-access devices). The method for dynamically control data flows of MTC local-access devices in a MTC network could be adapted to/applied to a ANDSF in an access network of a MNO, and could be applied to MTC networks in FIGS. 2-3 and following FIGS. 4, 13, and 14A.

Figure 4:
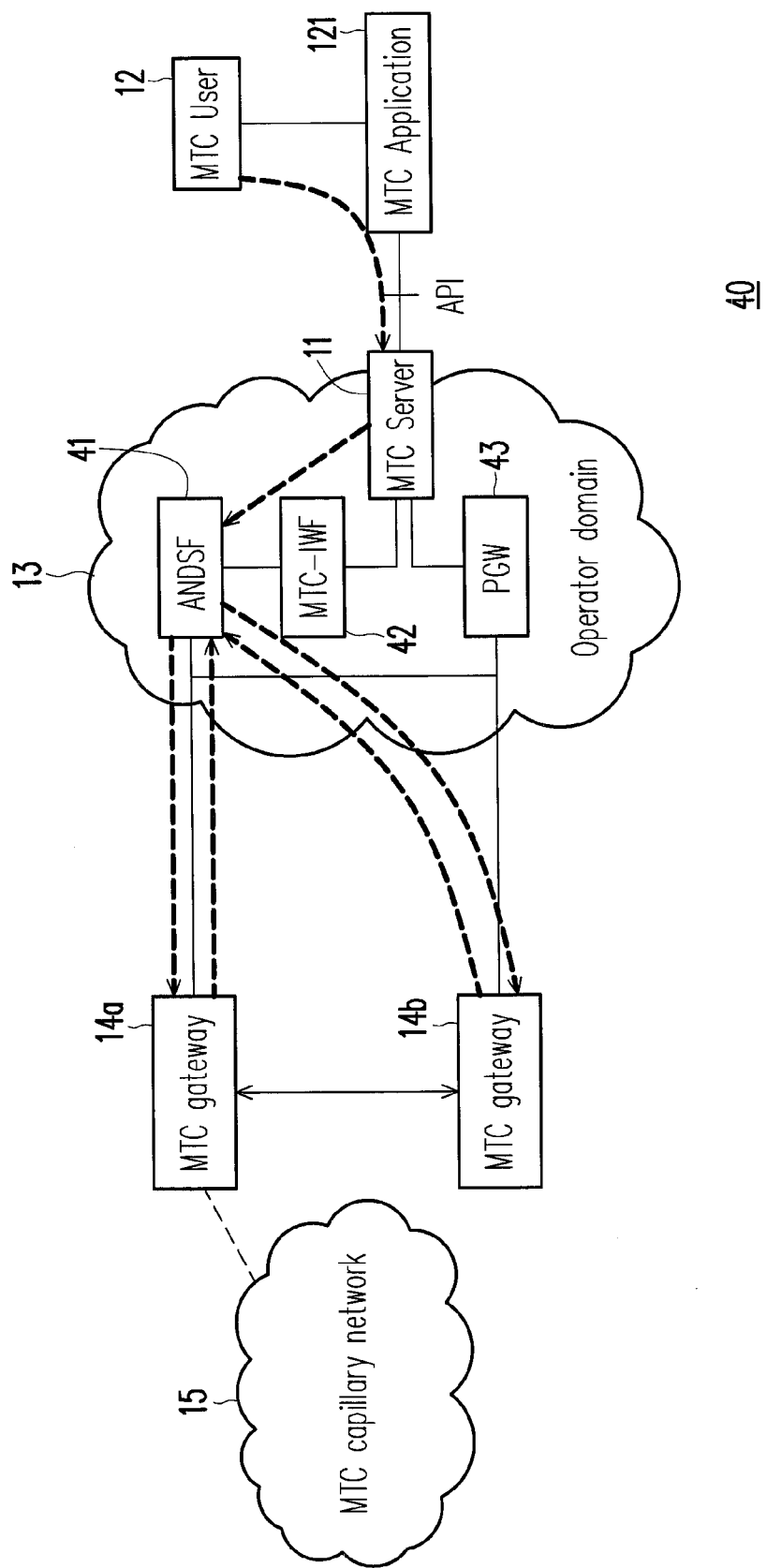
FIG. 4 illustrates a MTC network according to an exemplary embodiment.

FIG. 4 illustrates system architecture of a MTC network according to another exemplary embodiment. Referring to FIG. 4, a MTC network 40 is similar to the MTC networks 10, 20. In the MTC network 40, the operator domain 13 (which could be referred to a MNO domain) also includes a MTC inter-working function (MTC-IWF) 42, a packet gateway (PGW) 43. The MNO domain could be called an evolved packet core (EPC) in the present embodiment. Further, the ANDSF 41 in the core network of the operator domain 13 is connected to the MTC-IWF 42; the MTC-IWF 42 is connected to the MTC server 11; the PGW 43 is connected to the MTC server 11, the MTC gateways 14a, 14b; the MTC user 12 could access the MTC server 11 via the MTC application 121 and the API. The MTC gateway 14a, 14b could be connected to the ANDSF 41 through their respective 3GPP access networks (not shown in FIG. 4).

In a proposed method for dynamically controlling data flows of a MTC network, the ANDSF 41 has additional functionality to receive information regarding types of MTC traffic, MTC traffic volume, file size, and so like over S14 interface from MTC gateways 14a, 14b. Also, the MNO information originally provided from the operator domain 13 to the ANDSF 41 may be used to set inter-MTC gateways routing policy rules (for example, resource usage information of MNO entities such as eNBs). Further, information regarding capillary network properties (for example, scheduled busy hours), topology of the capillary networks and interconnected MTC gateway topology may also be provided by the MTC server 11 to the ANDSF 41.

Figure 5A:
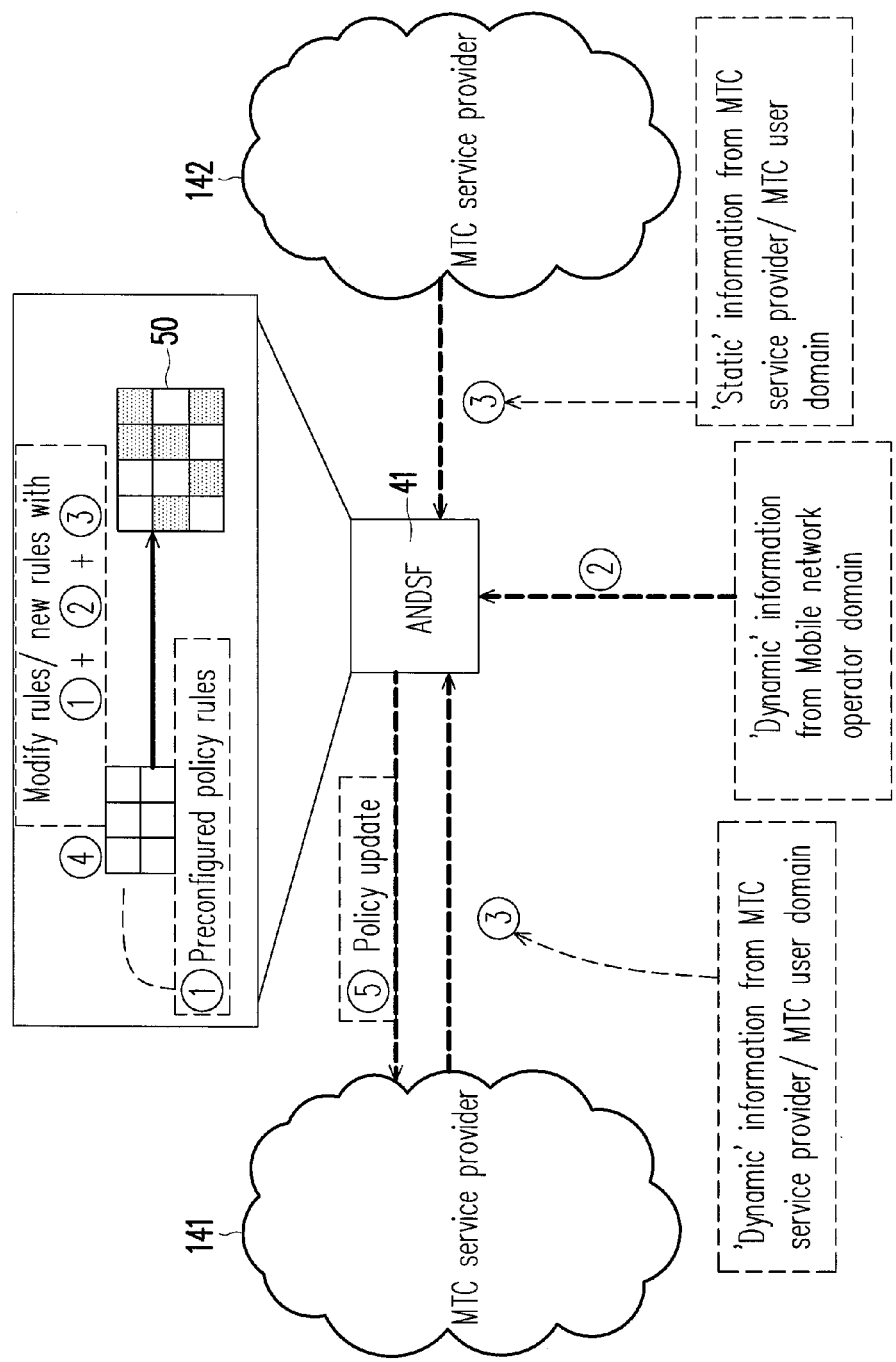
FIG. 5A and FIG. 5B are schematic diagrams illustrating obtaining relevant information and modifying policy rules of data flows in a MTC network according to another exemplary embodiment.
Figure 5B:
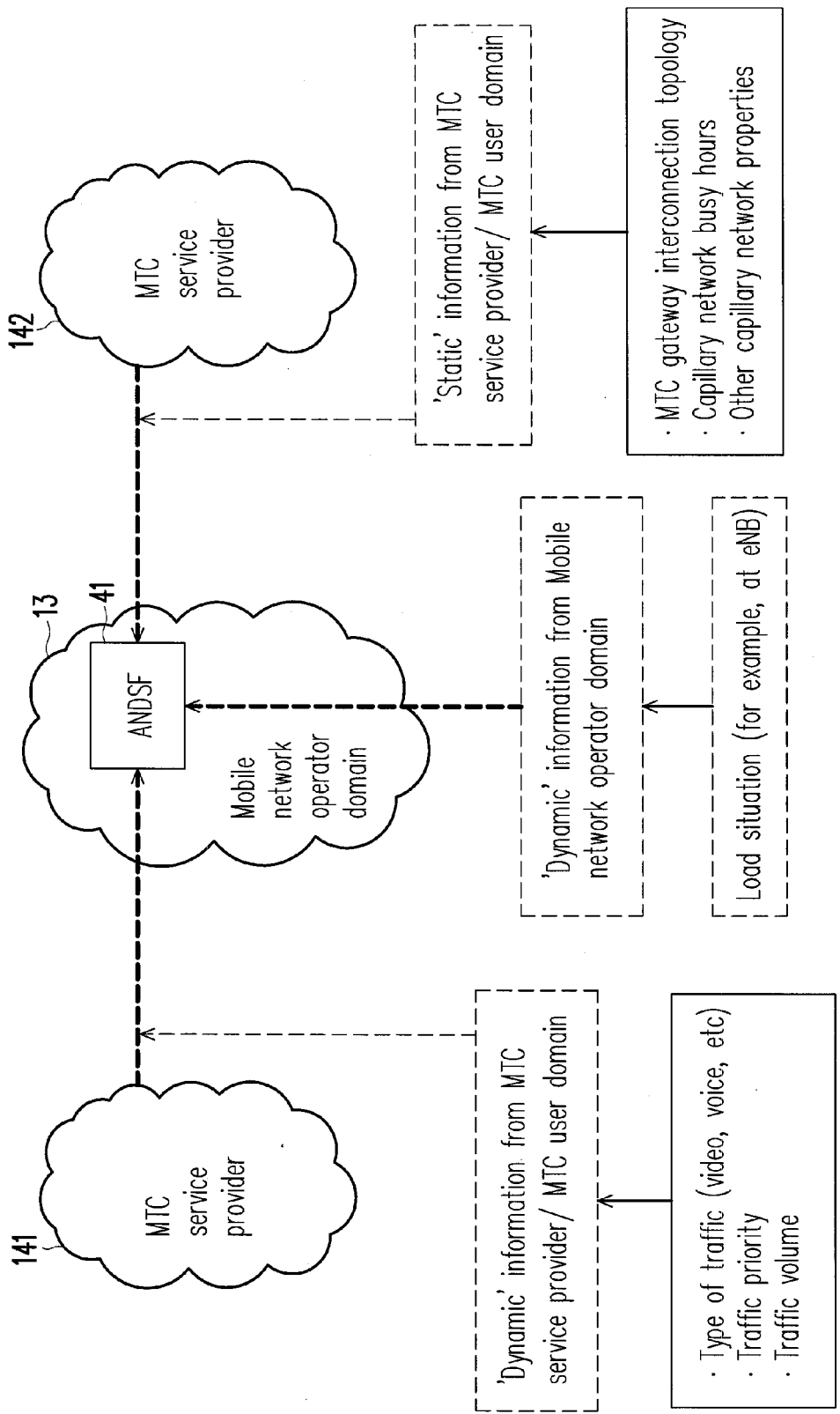

FIG. 5A and FIG. 5B are schematic diagrams of obtaining relevant information and modifying policy rules of data flows in a MTC network according to another exemplary embodiment. FIG. 5A provides a detailed illustration on obtaining relevant information from MTC gateways, the MNO domain and MTC server, and further modification of policy rules of data flows. The policy rules may include, for example, routing tables of data flow packets from MTC local-access devices to the MTC server, and vice versa. The step 1 in FIG. 5A is the ANDSF 41 obtaining pre-configured policy rules. The pre-configured policy rules may refer to "static" information with regard to the MNO domain, and the pre-configured policy rules are provided by the network operator to the ANDSF. In FIG. 5A, there are four types of information such as: "static" information from the MNO domain and MTC service provider/MTC user domain; and "dynamic information" from MNO domain and MTC service provider/MTC user domain. The step 2 in FIG. 5A is the ANDSF 41 obtaining "dynamic" information from MNO domain. In particular, the "dynamic" information from MNO domain (e.g., eNB loading situation) may be provided to the ANDSF.

The step 3 in FIG. 5A is the ANDSF 41 obtaining "static" information from MTC service providers/MTC user domain, and also obtain "dynamic" information from MTC service providers/MTC user domain. Here, the MTC service providers 141 may refer to a MTC gateway plus MTC capillary networks; and the MTC service provider 142 may refer to the MTC server. The steps 3 and 5 show communication between the ANDSF 41 and the MTC gateways. The step 4 in FIG. 5A is that the ANDSF 41 takes pre-configured policy rules and the information received through the steps 2, 3 to modify the pre-configured policy rules obtained in the step 1 or create new policy rules. Then, the ANDSF 41 generates new policy rule(s) 50 for data flows in the step 5.

The step 5 in FIG. 5A is the ANDSF 41 provides policy rules update to all MTC gateways which may be connected to the ANDSF 41. That is, the ANDSF 41 informs the MTC gateways of the new/updated policy rules 50.

FIG. 5B provides a detailed illustration on information in the steps 1-3 in FIG. 5A. The "dynamic" information from MNO domain could be load situation, which may be, for example, loading at eNBs. The "dynamic" information from the MTC service provider 141/the MTC user domain could be, for example, types of traffic (in data flows), traffic priority and traffic volume. Here, traffic may refer to multimedia data, video signal, audio signal, control signal or any other kinds of messages. The "static" information from the MTC service provider 142/the MTC user domain could be, for example, the interconnection topology of interconnected MTC gateway, scheduled busy hours of capillary network(s) of the MTC service provider 142 and other properties (or other information which may be used for updating the policy rules at the ANDSF 41) of the capillary networks.

Figure 6:
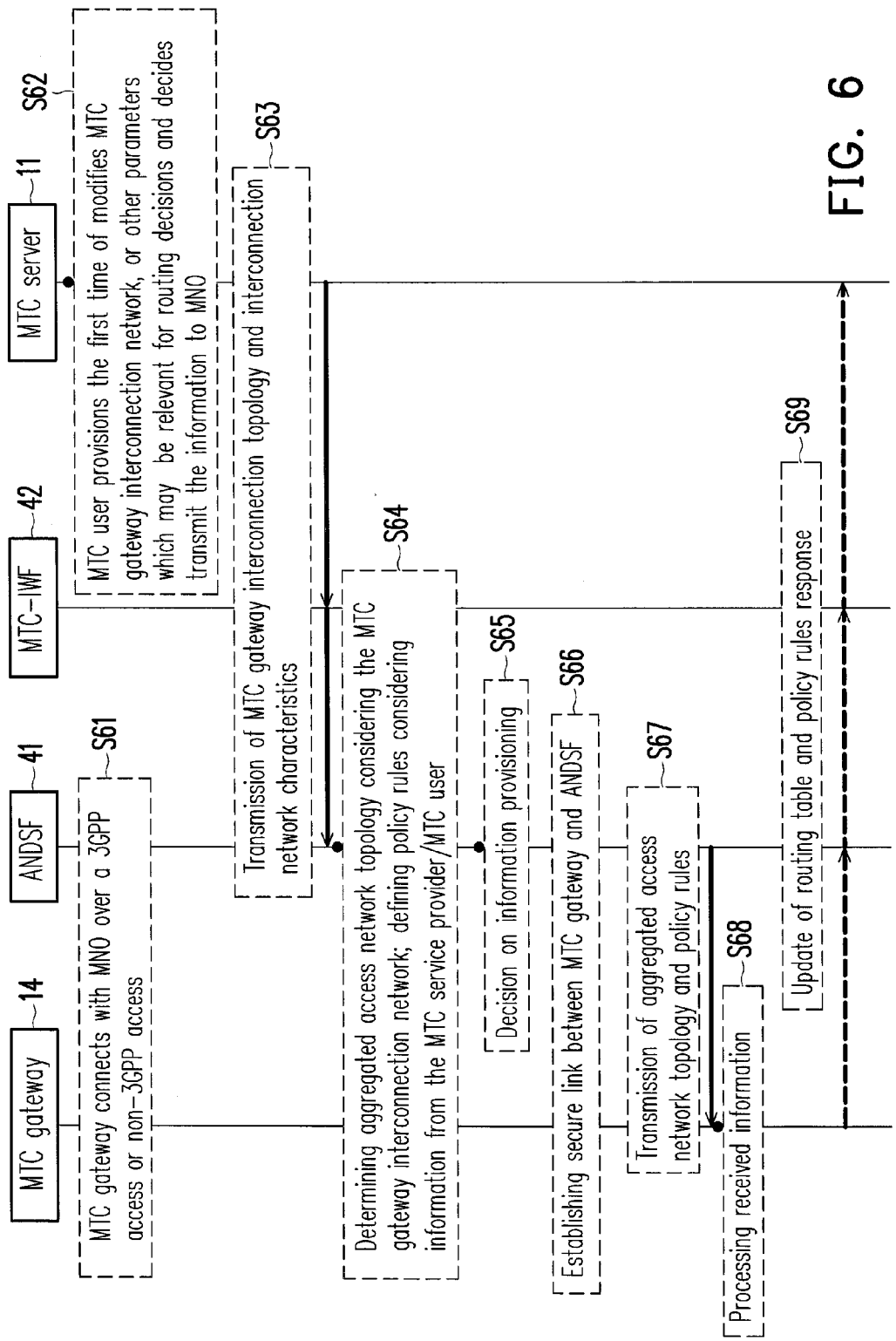
FIG. 6 is a message sequence chart illustrating information transmission for ANDSF over control plane in a MTC network according to an exemplary embodiment.

FIG. 6 is a message sequence chart illustrating information transmission for ANDSF over control plane in a MTC network according to another exemplary embodiment. Through the approach of information transmission involved with MTC gateway(s), ANDSF, MTC-IWF and MTC server(s), the ANDSF may obtain relevant information for the update of the policy rules for the data flows of the MTC local access device(s). Step S61 is a precondition, in which, the MTC gateway 14 connects with the ANDSF 41 in the EPC (or the MNO domain) over a 3GPP access network or non-3GPP access network. The connection between the MTC gateway 14 and the ANDSF 41 over the 3GPP access network or the non-3GPP access network may be referred to FIGS. 2-3.

In step S62, at the MTC server 11, the MTC user provisions the first time or modifies information of MTC gateway interconnection network or other parameters which may be relevant for routing decisions and decides to transmit the information to the MNO. In step S63, from the MTC server 11 to ANDSF 41 (directly or through intermediate node, e.g. the MTC-IWF 42), the MTC server 11 may transmit MTC gateway interconnection topology and interconnection network characteristics, and so like, to the MNO/the ANDSF 41, provided that MTC user (accessing the MTC server 11) has the authorization for such information provision.

In step S64, at the ANDSF 41, the ANDSF 41 receives information from the MTC server 11. Also, the ANDSF 41 checks that information was transmitted from an authorized MTC server and that data format of the information is correct. Further, the ANDSF 41 determines whether the received information (the received data) contains new MTC gateway interconnection information; and when the received information contain new MTC gateway interconnection information, the ANDSF 41 creates/updates MTC gateway interconnection table, provided that the MTC user and MNO have agreement in place that such information shall be used in Inter-system routing policy (ISRP) of the MNO. From another perspectives, in the step S64, the ANDSF 41 may determine aggregated access network topology considering the MTC gateway interconnection topology, and define policy rules considering information from the MTC service provider/the MTC user.

In step S65, the ANDSF 41 makes decision on information provisioning. That is, the ANDSF 41 may determine whether the received information (or the received data) contains new "other" information relevant for policy rules; and when the received information contains new "other" information relevant for policy rules, the ANDSF 41 may update related policy rules or create new policy rules, provided that MTC user and MNO have agreement in place that such information shall be used in ISRP. For example, the ANDSF 41 may retrieve ISRP for each new MTC gateway/updated MTC gateway, and aggregate the received ISRP with new MTC information/updated information in MTC gateway interconnection table.

In step S66, the ANDSF 41 may establish a secure link between the MTC gateways and the ANDSF 41. In step S67, the ANDSF 41 may transmit aggregated access network topology and new policy rules (or enhanced policy rules) to the MTC gateway 14 over S14 reference point. The enhanced policy rules may Inter-system routing policy (ISRP) for each one of the MTC gateways in the MTC gateway interconnection table. At the MTC gateway 14, in step S68, the MTC gateway 14 processes received information (for example, the aggregated access network topology and new policy from the ANDSF 41). In step S69, from the MTC gateway 14 to the MTC server 11 (through the ANDSF 41 and, optionally, the MTC-IWF 42), the MTC gateway 14 may transmit a response to the MTC server 11, to inform the MTC server 11 of successful update of the routing table and policy rule(s).

Figure 7:
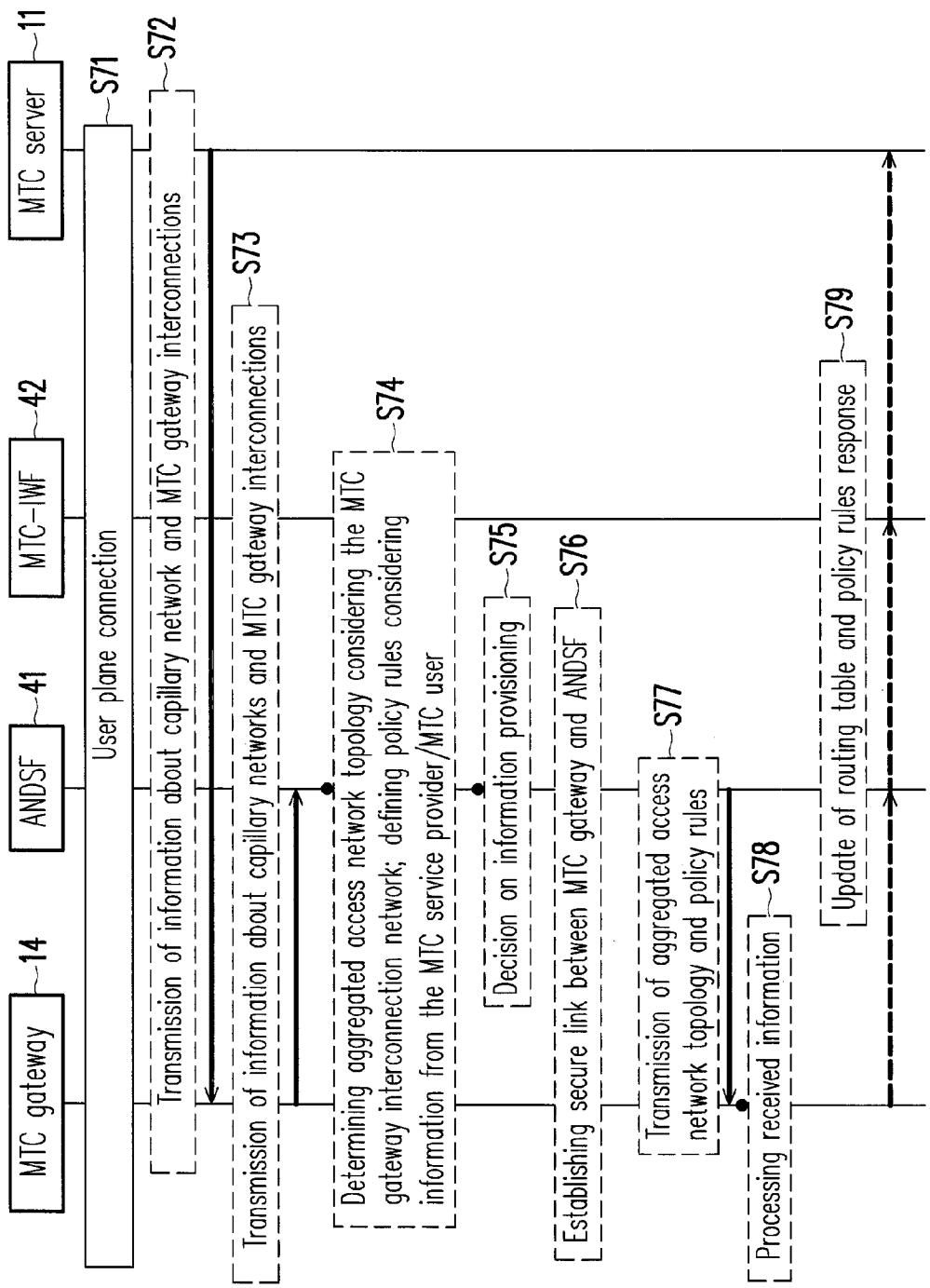
FIG. 7 is a message sequence chart illustrating information transmission for ANDSF over user plane in a MTC network according to an exemplary embodiment.

FIG. 7 is a message sequence chart illustrating information transmission for ANDSF over user plane in a MTC network according to another exemplary embodiment. The message sequence chart in FIG. 7 is similar to that in FIG. 6, but the user plane may deliver more data than the control plane. Through the approach of information transmission involved with MTC gateway(s), ANDSF, MTC-IWF and MTC server(s), the ANDSF may obtain relevant information for the update of the policy rules for the data flows of the MTC local access device(s). Step S71 is a precondition, in which, the MTC gateway 14, the ANDSF 41 in the EPC (or the MNO domain), the MTC-IWF 42 and the MTC server 11 establish user plane connection.

In step S72, the MTC server 11 transmits information about MTC gateway interconnection topology and capillary network topology to the MTC gateway 14. In step S73, the MTC gateway 14 transmits the information about the MTC gateway interconnection topology and the capillary network topology to the ANDSF 41.

In step S74, at the ANDSF 41, the ANDSF 41 receives information from the MTC server 11. Also, the ANDSF 41 checks that information was transmitted from an authorized MTC server and that data format of the information is correct. Further, the ANDSF 41 determines whether the received information (the received data) contains new MTC gateway interconnection information; and when the received information contain new MTC gateway interconnection information, the ANDSF 41 creates/updates MTC gateway interconnection table, provided that the MTC user and MNO have agreement in place that such information shall be used in Inter-system routing policy (ISRP) of the MNO. From another perspectives, in the step S74, the ANDSF 41 may determine aggregated access network topology considering the MTC gateway interconnection topology, and define policy rules considering information from the MTC service provider/the MTC user.

In step S75, the ANDSF 41 makes decision on information provisioning. That is, the ANDSF 41 may determine whether the received information (or the received data) contains new "other" information relevant for policy rules; and when the received information contains new "other" information relevant for policy rules, the ANDSF 41 may update related policy rules or create new policy rules, provided that MTC user and MNO have agreement in place that such information shall be used in ISRP. For example, the ANDSF 41 may retrieve ISRP for each new MTC gateway/updated MTC gateway, and aggregate the received ISRP with new MTC information/updated information in MTC gateway interconnection table.

Steps S76-S79 are respectively similar to the steps S66-S69, and may be referred to corresponding steps in FIG. 6.

Figure 8:
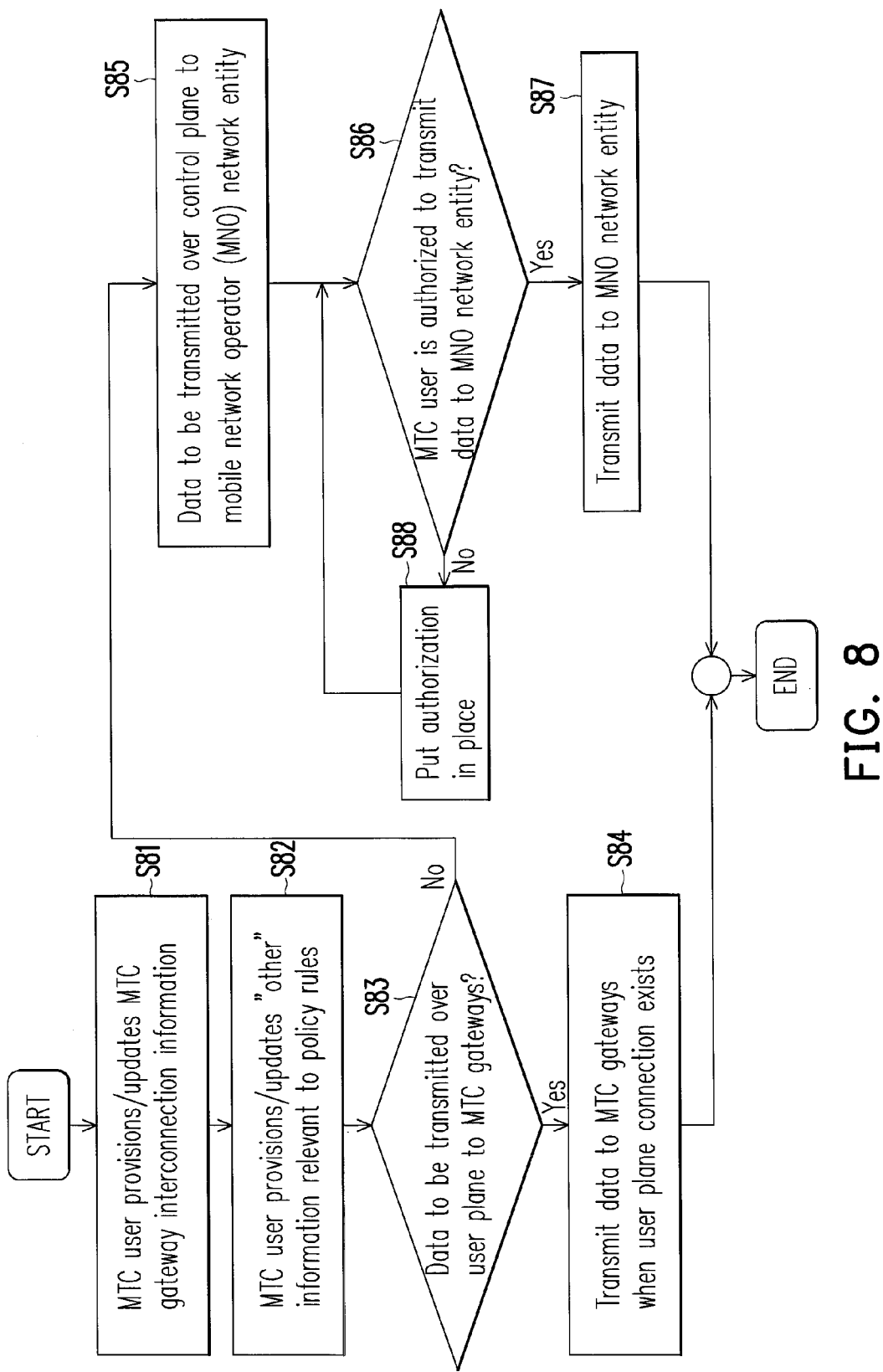
FIG. 8 is a flowchart illustrating a MTC server process flow according to an exemplary embodiment.

FIG. 8 is a flowchart illustrating a MTC server process flow according to an exemplary embodiment. The MTC server process flow may be adapted to any MTC server illustrated in previous exemplary embodiments and also be adapted to embodiments of FIGS. 13 and 14A-14D. Also, MTC server process flow could be comprehended more clearly in accordance with FIG. 6-FIG. 7. Referring to FIG. 8, in step S81, a MTC user (or a MTC server) may provision or update MTC gateway interconnection information. In step S82, the MTC user (or the MTC server) may provision or update "other" information relevant to policy rules (of data flows of MTC local-access devices). In step S83, the MTC server determines whether the data (or the provisioned information) to be transmitted over user plane to the MTC gateways. When the data (or the provisioned information) to be transmitted to the MTC gateways is determined over the user plane in the step S83, step S84 is executed after the step S83; otherwise, step S85 is executed after the step S83.

In step S83, the MTC server may transmit the data (or the provisioned information) to the MTC gateways when the user plane connection exists. In step S85, the MTC server may decide to transmit the data (or the provisioned information) to the MNO network entity (such as an eNB) over control plane. In step S86, the MTC server determines whether the MTC user is authorized to transmit data (or the provisioned information) to the MNO network entity. When the MTC user (or the MTC server) determines that the MTC user is authorized to transmit data (or the provisioned information) to the MNO network entity in the step S86, step S87 is executed after the step S86; otherwise, step S88 is executed after the step S86. In the step S87, the MTC user (or the MTC server) may transmit data (or the provisioned information) to the MNO network entity. In the step S88, the MTC user (or the MTC server) puts authorization in place, and the step S86 is executed again after the step S88. After the step S84 or the step S87, the MTC server process flow may be completed.

Figure 9A:
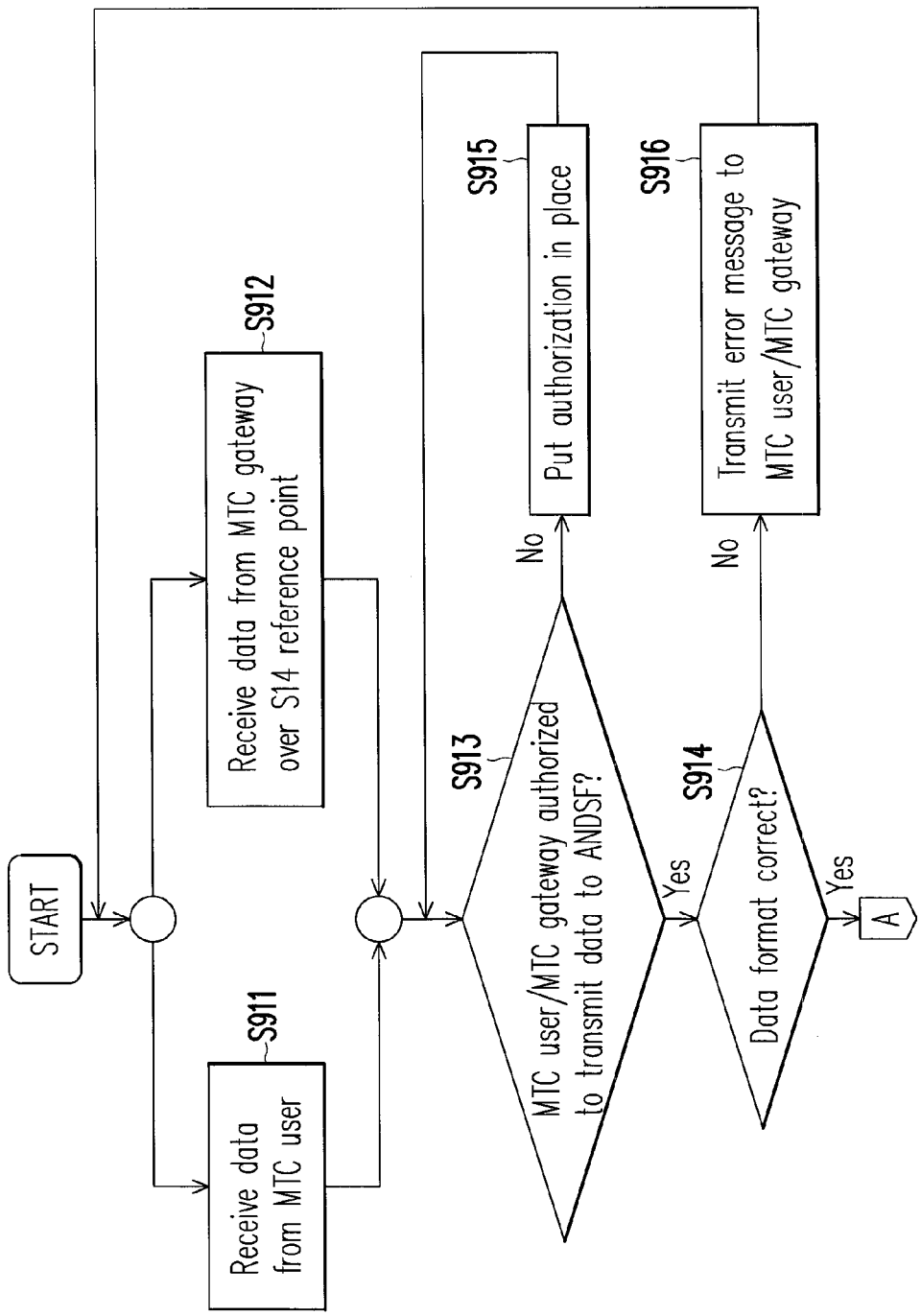
FIG. 9A-FIG. 9C are flowcharts illustrating a ANDSF process flow according to an exemplary embodiment.
Figure 9B:
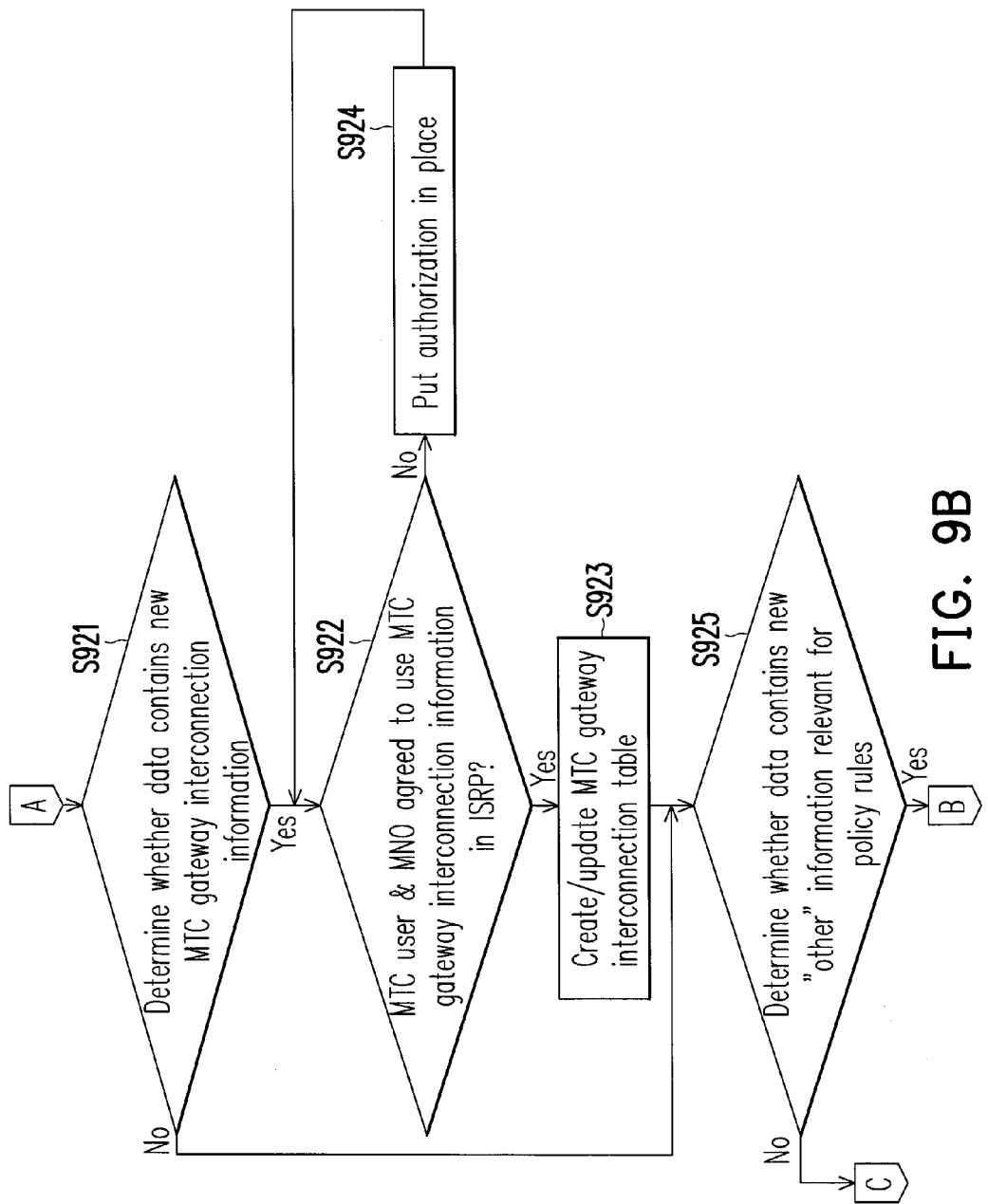
Figure 9C:
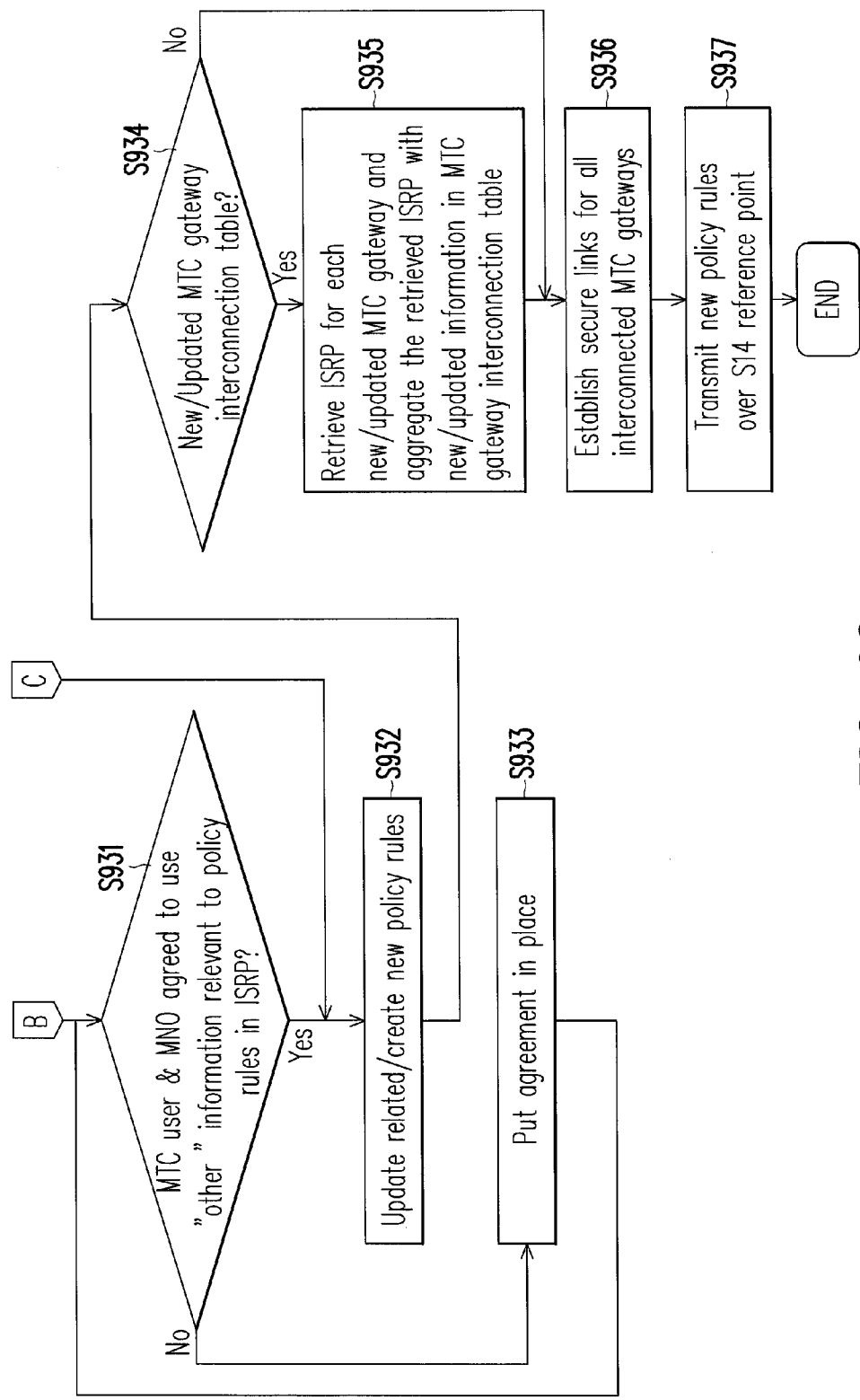

FIG. 9A-FIG. 9C are flowcharts illustrating a ANDSF process flow according to an exemplary embodiment. FIG. 9A-FIG. 9C altogether illustrate the ANDSF process flow, and the ANDSF process flow may be adapted to any ANDSF illustrated in previous exemplary embodiments and also be adapted to embodiments of FIGS. 13 and 14A-14D. Also, the ANDSF process flow could be comprehended more clearly in accordance with FIG. 6-FIG. 7. Referring to FIG. 9, in step S901, an ANDSF receives data (or information) from a MTC user (or a MTC server); and in step S902, the ANDSF receives data (or information) from a MTC gateway over a S14 reference point. In step S913, the ANDSF checks whether the MTC user/the MTC server/the MTC gateway are authorized to transmit data to the ANDSF. When the ANDSF determines that the MTC user/the MTC server/the MTC gateway are authorized to transmit data to the ANDSF in the step S913, step S914 is executed after the step S913; otherwise, step S915 is executed after the step S913.

In the step S914, the ANDSF determines whether the received data (or the received information) is in a correct format. When the ANDSF determines that the received data (or the received information) are not in correct format, step S916 is executed after the step S914; otherwise, step S921 is executed after the step S914. In the step S915, the ANDSF makes the MTC user/the MTC server/the MTC gateway are authorized to transmit data to the ANDSF, and the step S913 is executed again after the step S915. In the step S916, the ANDSF may transmit an error message to the MTC user/the MTC server/the MTC gateway, and the step S911 or the step S912 is executed again after the step S916.

In the step S921, the ANDSF determines whether the received data (or the received information) contains "new" MTC gateway interconnection information. When the received data (or the received information) contains "new" MTC gateway interconnection information, step S922 is executed after the step S921; otherwise, step S925 is executed after the step S921. In the step S922, the ANDSF determines whether the MTC user/the MTC server/the MNO are agreed to use the MTC gateway interconnection information in ISRP. When the ANDSF determines that the MTC user/the MTC server/the MNO are agreed to use the MTC gateway interconnection information in ISRP in the step S922, step S923 is executed after the step S922; otherwise, step S924 is executed after the step S922. In the step S923, the ANDSF creates/updates the MTC gateway interconnection table provided that there is a storage unit which could store the MTC gateway interconnection table in the ANDSF. In the step S924, the ANDSF makes the MTC user/the MTC server/the MNO agreed to use the MTC gateway interconnection information in ISRP, and the step S922 is executed again after the step S924. In the step S925, the ANDSF determines whether the received data (or the received information) contains new "other" information relevant to policy rules (of data flows of MTC local-access devices). When the ANDSF determines that the received data (or the received information) contains new "other" information relevant to the policy rules, step S931 is executed after the step S925; otherwise, step S932 is executed after the step S925.

In the step S931, the ANDSF determines whether the MTC user/the MTC server/the MNO are agreed to use "other" information relevant to the policy rules in ISRP. When the ANDSF determines that the MTC user/the MTC server/the MNO are agreed to use "other" information relevant to the policy rules in ISRP in the step S931, step S932 is executed after the step S931; otherwise, step S933 is executed after the step S931. In the step S932, the ANDSF may update related policy rules or create new policy rules based on the received "other" information relevant to the policy rules. In the step S933, the ANDSF makes the MTC user/the MTC server/the MNO agreed to use "other" information relevant to the policy rules in ISRP, and the step S931 is executed again after the step S933. In the step S934, the ANDSF determines whether there is new MTC interconnection table/updated MTC gateway interconnection table. When the ANDSF determines there is new MTC interconnection table/updated MTC gateway interconnection table in the step S934, step S935 is executed after the step S934; otherwise, step S936 is executed after the step S934.

In the step S935, the ANDSF may retrieve ISRP for each of the new MTC gateway or the update MTC gateway, and aggregate the retrieved ISRP with the new information/the update information in the MTC gateway interconnection table. In the step S936, the ANDSF may establish secure links to all interconnected MTC gateways. In the step S937, the ANDSF may transmit new policy rules over the S14 reference points to the interconnected MTC gateways. The ANDSF process flow is completed after the step S937.

Figure 10:
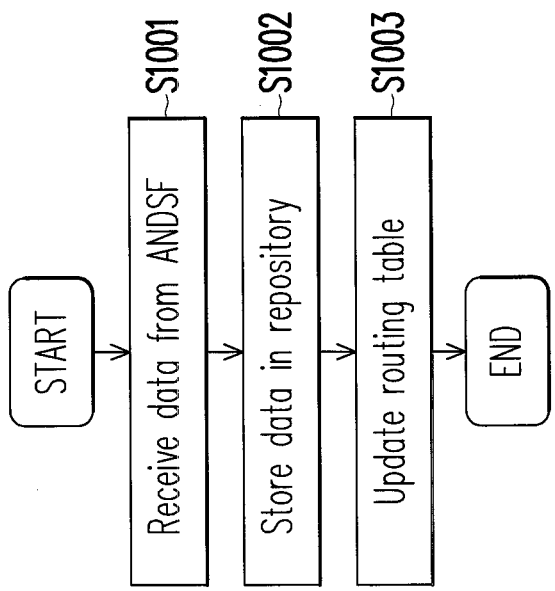
FIG. 10 is a flowchart illustrating a MTC server process flow according to an exemplary embodiment.

FIG. 10 is a flowchart illustrating a MTC server process flow according to an exemplary embodiment. FIG. 10 illustrates the MTC server process flow, and the MTC server process flow may be adapted to any MTC server illustrated in previous exemplary embodiments and also be adapted to embodiments of FIGS. 13 and 14A-14D. Also, the MTC server process flow could be comprehended more clearly in accordance with FIG. 6-FIG. 7. Referring to FIG. 10, in step S1001, a MTC server receives data (or information) from an ANDSF; in step S1002, the MTC server stores the received data (or the received information) in its local repository (which may be a memory storage of the MTC server); and in step S1003, the MTC server updates its routing table.

Figure 11:
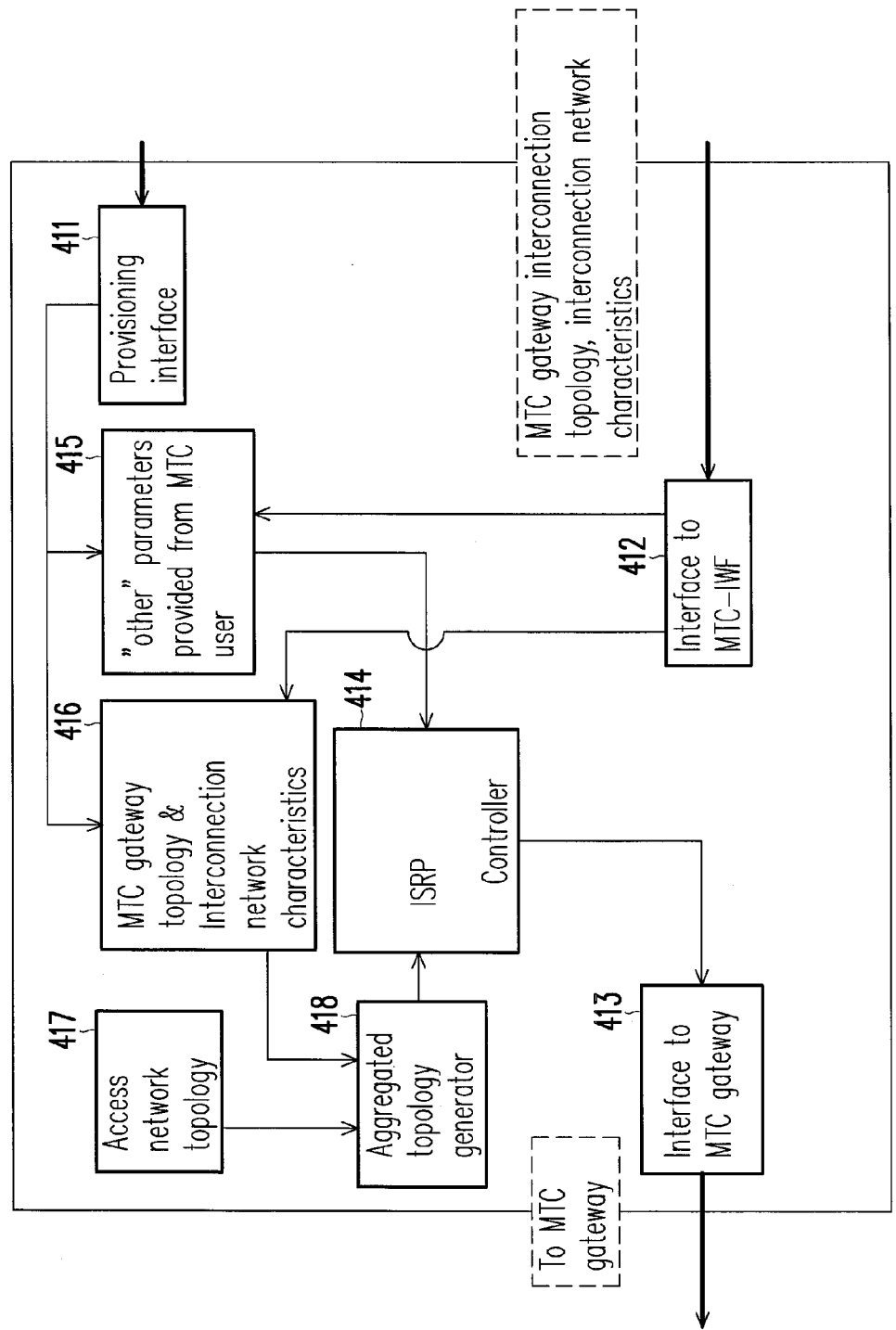
FIG. 11 is a functional block diagram illustrating a ANDSF according to an exemplary embodiment.

In order to implement the message sequence flow illustrated in FIGS. 5-6 and ANDSF process flow, the present disclosure proposes ANDSF functionality enhancements as illustrated in FIG. 11. Referring to FIG. 11, the ANDSF 41 includes a provisioning interface 411, an interface to MTC gateway(s) 412, an interface to MTC gateway 413, a controller unit storing ISRP (or abbreviated as ISRP controller) 414, a storage unit 415 storing "other" parameters (provided from the MTC user/the MTC server), a storage unit storing MTC gateway interconnection topology and interconnection network characteristics 416, a storage unit storing access network topology 417, and an aggregated topology generator 418. The ANDSF 41 may also include a processor (not shown) and a network interface (not shown), where the process has its embedded software/firmware to perform controlling or comparison tasks, and the network interface is configured to connect the ANDSF 41 to the MTC-IWF, MTC gateway(s) or MTC server(s).

Referring to FIG. 11, the storage unit 416 is configured to store the information regarding MTC gateways topology and interconnection network characteristics; the storage unit 415 is configured to store "other" MTC user provided parameters (i.e., not related to inter-MTC gateway connections), for instance, the scheduled capillary network peak hour; the provisioning interface 413 is configured to receive MTC gateway interconnection information and capillary network information from a MTC server, either directly or through an intermediate device. Here, the capillary network information may be, for example, capillary network busy hours; the MTC gateway interconnection information may be, for example, MTC gateway interconnection topology and MTC gateway interconnection network characteristics, such as bandwidth, latency and so like.

Referring to FIG. 11, the provisioning interface 411 is an optional interface, which is configured at the ANDSF where MTC gateway interconnection information and capillary network information and can be provisioned directly. The aggregated topology generator 418 is configured to combines access network discovery and selection information with the MTC interconnection information to build an aggregated topology map. The aggregated topology (may) comprise the access networks topology (provided that it is available in the ANDSF 41) and the new information regarding the inter-MTC gateway connections. The inter-MTC gateway links characteristics may be taken into consideration during building of the aggregated topology map. The aggregated topology may then be provided by the aggregated topology generator 418 to the ISRP controller 414 which stores ISRP.

Further, the ISRP (controller) 414, which stores ISRP, may be modified to be able to use the aggregated topology information and "other" information for creating policy rules. The ISRP (controller) 414 then may determine policy rules specific to MTC gateway, where the policy rules may be configured for any of the interconnected MTC gateways, and the ISRP (controller) 414 transmits the policy rules to each of the interconnected MTC gateways over the S14 reference point.

Figure 12:
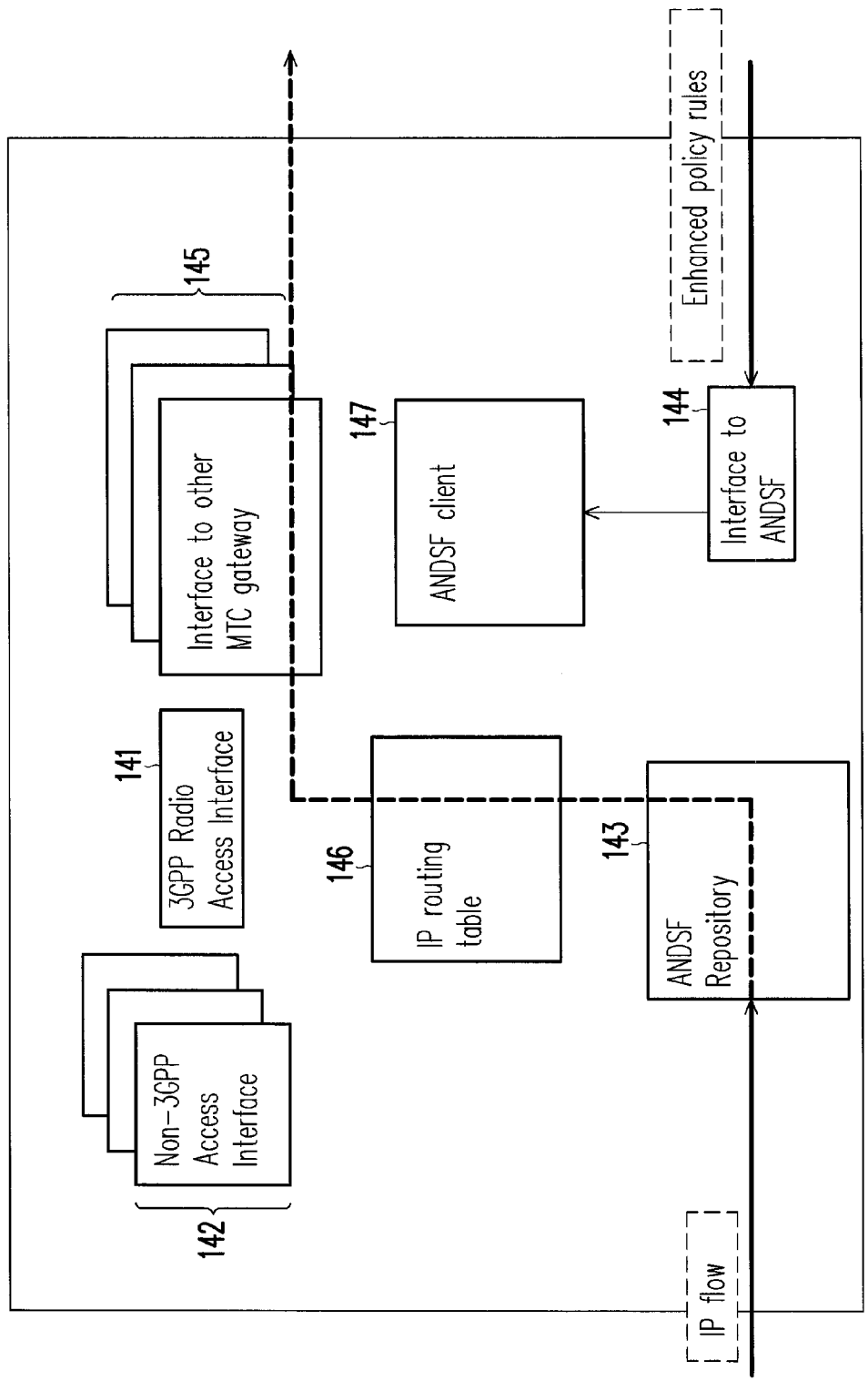
FIG. 12 is a functional block diagram illustrating a MTC gateway according to an exemplary embodiment.

In order to implement the message sequence flow illustrated in FIGS. 5-6 and ANDSF process flow, the present disclosure proposed MTC gateway functionality enhancements as illustrated in FIG. 12. Referring to FIG. 12, the MTC gateway 14 may include one 3GPP radio access interface 141, at least one non-3GPP access interface (which may include non-3GPP access interfaces such as Wi-Fi, Bluetooth, ZigBee access interfaces but the present disclosure are not limited thereto) 142, a storage unit 143 configured as ANDSF repository (or abbreviated as the ANDSF repository 143), an interface to ANDSF 144, at least one interface to other MTC gateway(s) 145, a storage unit 146 storing IP routing table and an ANDSF client 147. The MTC gateway 14 may also include a processor (not shown), a network interface (not shown) and at least one antenna unit, where the process has its embedded software/firmware to perform controlling or comparison tasks, the network interface is configured to connect the MTC gateway 14 to the MTC-IWF, ANDSF or MTC server(s), and the antenna units may be configured to transmit/receive radio frequency signals for 3GPP access interface or non-3GPP access interface(s).

The 3GPP radio access interface 141 is configured to provide connection between the MTC gateway 14 to an access network in the mobile network operator domain. The at least one non-3GPP access interface 142 is configured to provide the MTC gateway 14 with connections to the at least one MTC server through other access networks different from the access network in the mobile network operator domain.

The ANDSF client 147 is configured to receive the enhanced policy rules from a network device (for example, ANDSF). The ANDSF client 147 may also include a storage unit, which is configured to store the enhanced policy rules. Referring to FIG. 12, the storage unit 143 is connected to the ANDSF client 147, and configured to store the enhanced policy rule(s). The storage unit 146 is connected to the storage unit 143, and is configured to store the IP routing table, where upon receiving the information from ANDSF, each one of the interconnected MTC gateways needs to populate the IP (stack) routing table accordingly to enable a local-access device using a MTC gateway which does not provide coverage for the area where the local-access device is located to access the access network (for example, supporting 3GPP access technology). Also, the IP routing table is updated according to the enhanced policy rule(s) from the ANDSF.

Figure 13:
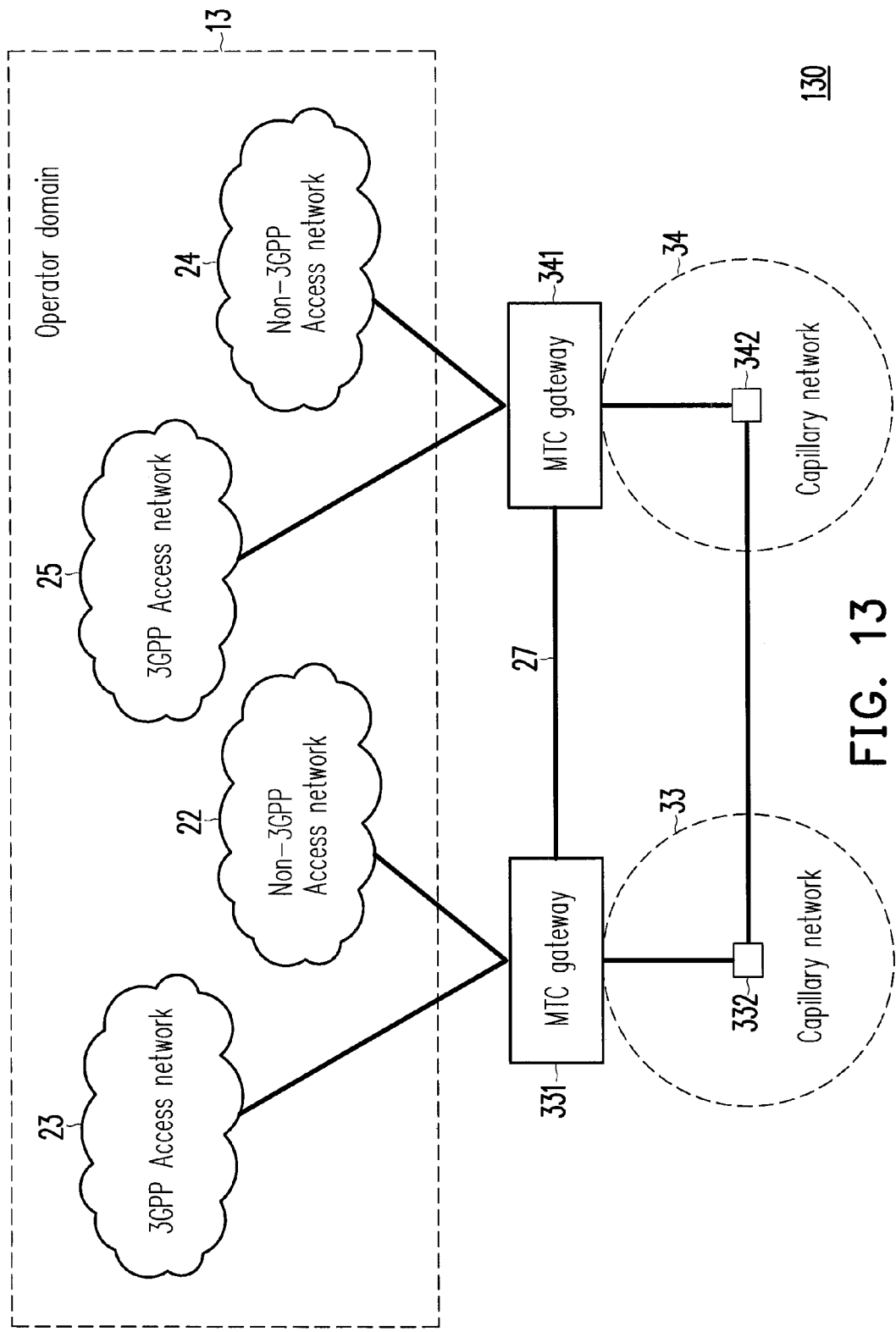
FIG. 13 illustrates system architecture of a MTC network according to an exemplary embodiment.

FIG. 13 illustrates system architecture of a MTC network according to an exemplary embodiment. Referring to FIG. 13, a MTC network 130 may include access networks 22, 23, 24, 25, which may be respectively a non-3GPP access network 22, a 3GPP access network 23, a non-3GPP access network 24, a 3GPP access network 25. The MTC network 130 may also include at least two MTC gateways 331, 341 connecting to their respective capillary networks 33, 34. The MTC gateway 331 may be connected to the non-3GPP access network 22 and the 3GPP access network 23; the MTC gateway 341 may be connected to the non-3GPP access network 24 and the 3GPP access network 25; and the MTC gateways 331, 341 have a direct communication 27 between each other to form a MTC gateway interconnection network. The direct communication 27 may be a primary route for the MTC gateways 331, 341. On the other hand, connection paths connecting the MTC gateways 331, a capillary network router 332 (in the capillary network 33), a capillary network router 342 (in the capillary network 34) and the MTC gateways 341 serve as a secondary route for the MTC gateways 331, 341. A MTC server (not shown in FIG. 13) is connected to the non-3GPP access network 22, the 3GPP access network 23, the non-3GPP access network 24, the 3GPP access network 25 or other communication links/communication networks.

Referring to FIG. 13, the 3GPP access network 23 belongs to a mobile communication network denoted as "PLMN X" and one of eNBs in the 3GPP access network 23 serves a cell denoted as "Cell_Id 1", and the MTC gateway 331 may be connected to the cell denoted as "Cell_Id 1". The 3GPP access network 25 belongs to a mobile communication network denoted as "PLMN X" and one of eNBs in the 3GPP access network 25 serves a cell denoted as "Cell_Id 2", and the MTC gateway 341 may be connected to the cell denoted as "Cell_Id 2". The non-3GPP access network 22 belongs to a wireless communication network denoted as "SSID Wi-Fi 1" and one of access point devices in the non-3GPP access network 22 may be denoted as "BSSID A", and the MTC gateway 331 may be connected to the access point device denoted as "BSSID A". The non-3GPP access network 24 belongs to a wireless communication network denoted as "SSID Wi-Fi 2" and one of access point devices in the non-3GPP access network 24 may be denoted as "BSSID B", and the MTC gateway 341 may be connected to the access point device denoted as "BSSID B".

In an exemplary embodiment, Table I and Table II illustrate examples of ISRP tables which may be stored in the ANDSF in a MNO domain. For example, Table I may be an ISRP table for MTC gateway 331; Table II may be an ISRP table for MTC gateway 341.

TABLE I

| Traffic description | Preferred radios | Forbidden radios |
|---|---|---|
| Destination port = 3954-3963 | 3GPP [PLMN X, cell_ID 1] | Wi-Fi [SSID Wi-Fi 1, BSSID A] |

TABLE I-continued

| Traffic description | Preferred radios | Forbidden radios |
|---|---|---|
| Destination IP Address = 68.198.123.0/24 | Wi-Fi [SSID Wi-Fi 1, BSSID A] | |
| APN = "Internet" AND Destination port = 8431 | Wi-Fi [SSID Wi-Fi 1, BSSID A] | |

TABLE II

| Traffic description | Preferred radios | Forbidden radios |
|---|---|---|
| Destination port = 2544 | 3GPP [PLMN X, cell_ID 2] | Wi-Fi [SSID Wi-Fi 1, BSSID B] |
| Destination IP Address = 68.198.123.0/24 | Wi-Fi [SSID Wi-Fi 1, BSSID B] | |
| APN = "Internet" AND Destination port = 8431 | Wi-Fi [SSID Wi-Fi 1, BSSID B] | |

As can be seen from Table I and Table II, any one of ISRP table may include at least one traffic description field, at least one preferred radios field (or a preferred access technology as well as an radio access device), and at least one forbidden radios field (or a forbidden access technology as well as an radio access device). In Table I and Table II, APN refers to "access point name", and the "destination port" shown directly following the "APN" may be an operator routing port (or a gateway routing port) in Application layer.

In another exemplary embodiment, Table III illustrates an example of "Interconnection information" and an "aggregated ISRP table" which may be stored in an ANDSF in an MNO domain. The "Interconnection information" may be provided by a MTC server to an ANDSF. An enhanced ISRP table for MTC gateway 331 is shown in Table III, and the ANDSF has been taken into account the MTC gateway interconnection information for building the enhanced ISRP table for MTC gateway 331. The enhanced ISRP table for MTC gateway 331 may include at least one traffic description field, at least one preferred radios field (or a preferred access technology as well as an radio access device), and at least one forbidden radios field (or a forbidden access technology as well as an radio access device). The definitions of the traffic description field, preferred radios field and the forbidden radios field may be referred relevant descriptions of Table I and Table II.

TABLE III

| Traffic description | Preferred radios | Forbidden radios |
|---|---|---|
| Destination port = 3954-3963 | 3GPP [PLMN X, cell_ID 1] 3GPP [PLMN X, cell_ID 2] | Wi-Fi [SSID Wi-Fi 1, BSSID A] |
| Destination IP Address = 68.198.123.0/24 | Wi-Fi [SSID Wi-Fi 1, BSSID A] Wi-Fi [SSID Wi-Fi 2, BSSID B] | |
| APN = "Internet" AND Destination port = 8431 | Wi-Fi [SSID Wi-Fi 1, BSSID A] Wi-Fi [SSID Wi-Fi 2, BSSID B] | |

Referring to both FIG. 13 and Table III, Table III shows an enhanced ISRP table for the MTC gateway 331 shown in FIG. 13. The enhancements provided by the present disclosure in the enhanced ISRP table are, for example, "3GPP [PLMN X, cell_ID 2]", "Wi-Fi [SSID Wi-Fi 2, BSSID B]" shown in the preferred radios field. The enhancements in the enhanced ISRP table mean that the MTC gateway 331 can use an additional 3GPP access network 25 shown in FIG. 13 since the MTC gateway 331 is interconnected with the MTC gateway 341 in the embodiment of FIG. 13.

In yet another exemplary embodiment, Table IV illustrates an example of an enhanced ISRP table for the MTC gateway 331 which may be stored in the ANDSF in an MNO domain. The "Interconnection information" may be provided by a MTC server to an ANDSF. The enhanced ISRP table for MTC gateway 331 is shown in Table IV, and the ANDSF has been taken into account "other information" (different from the MTC gateway interconnection information) provided by the MTC server in order to build the enhanced ISRP table for MTC gateway 331. The enhanced ISRP table for MTC gateway 331 may include at least one traffic description field, at least one preferred radios field (or a preferred access technology as well as an radio access device), at least one forbidden radios field (or a forbidden access technology as well as an radio access device), and at least one routing criteria.

Referring to both FIG. 13 and Table IV, Table IV shows an enhanced ISRP table for the MTC gateway 331 shown in FIG. 13. The enhancements shown in Table IV are "other" information in addition to what is provided in Table III. For example, in Table IV, "Wi-Fi [SSID Wi-Fi 2, BSSID Brand B]" and "3GPP [PLMN X, cell_ID 2]" shown in the preferred radios field are the MTC gateway interconnection information (similar to those shown in Table III). On the other hand, "[Traffic type="Video Streaming"]", "Traffic type=File Transfer" and "File Size>20 MB" in traffic description field as well as scheduled time of "12:00-12:59" and "13:00-11:59" in the routing criteria field are the "other" information.

TABLE IV

| Traffic description | Preferred radios | Forbidden radios | Routing criteria: e.g., scheduled time |
|---|---|---|---|
| [Destination port = 3954-3958] AND [Traffic type = "Video Streaming"] | 3GPP [PLMN X, cell_ID 1] | Wi-Fi | 12:00-12:59 |
| Destination port = 3954-3958 AND NOT [Traffic type = "Video Streaming"] | Wi-Fi [SSID Wi-Fi 2, BSSID B] | ■3GPP [PLMN X, cell_ID 1] ■ Wi-Fi [SSID Wi-Fi 1, BSSID A] | 12:00-12:59 |
| Destination port = 3954-3963 | 3GPP [PLMN X, cell_ID 2] | Wi-Fi | 12:00-12:59 |
| Destination port = 3954-3963 | 3GPP [PLMN X, cell_ID 1] | Wi-Fi | 13:00-11:59 |

TABLE IV-continued

| Traffic description | Preferred radios | Forbidden radios | Routing criteria: e.g., scheduled time |
|---|---|---|---|
| Traffic type = "File Transfer" AND File Size > 20 MB | Wi-Fi [SSID Wi-Fi 2, BSSID B] | ■3GPP ■ Wi-Fi [SSID Wi-Fi 1, BSSID A] | |

Referring to Table IV, the definitions of the traffic description field, preferred radios field and the forbidden radios field may be referred relevant descriptions of Table I and Table II. The routing criteria may be, for example, a scheduled duration of time. Also, the traffic description field may include at least one destination port or at least one traffic type such as "video streaming", "file transfer" and so like. For example, when the traffic type is specified as "file transfer", a file size of the traffic type "file transfer" may also be specified in the traffic description field.

Figure 14A:
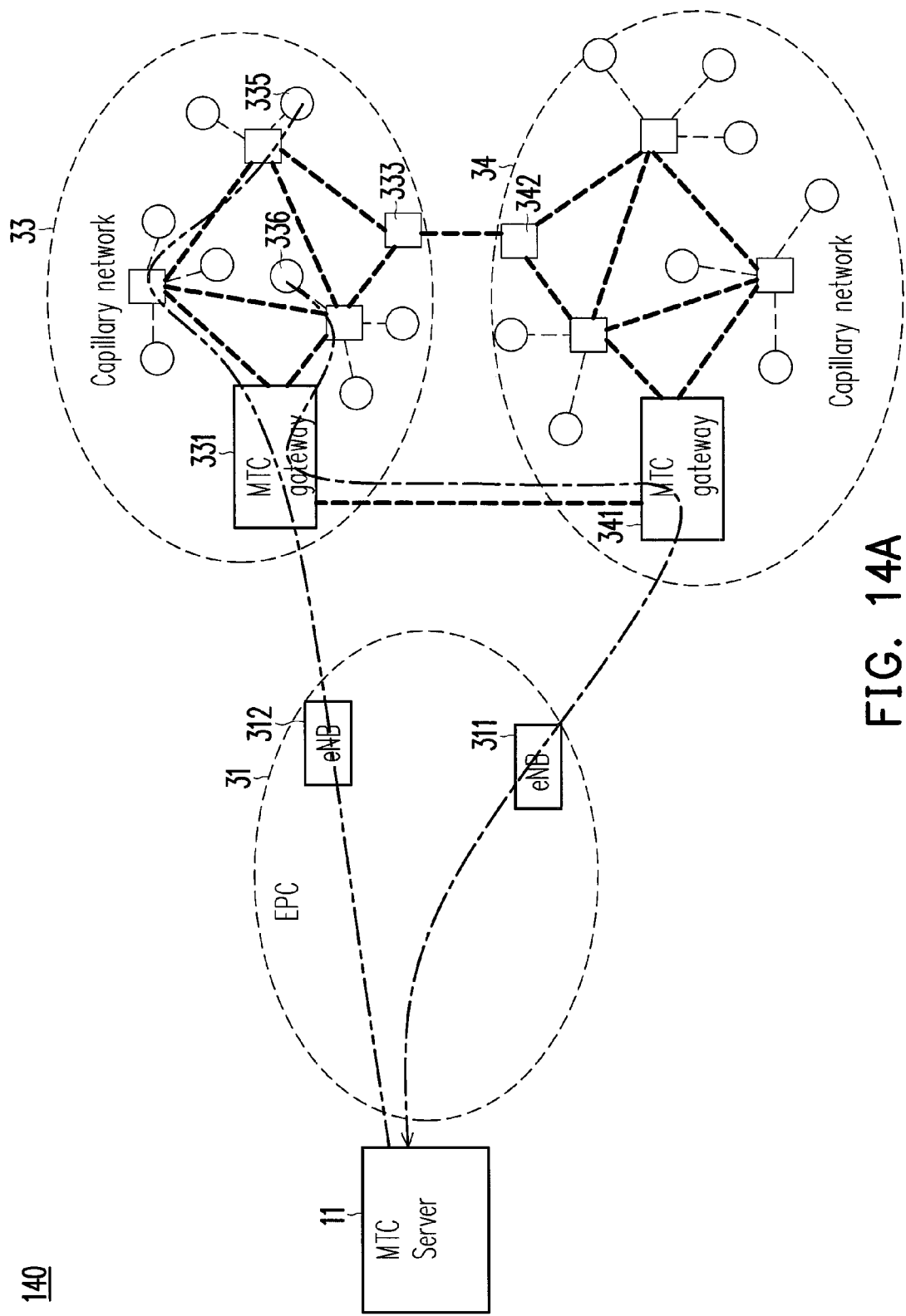
FIG. 14A-FIG. 14D are schematic diagrams illustrating different scenarios of dynamically controlling data flows of ANDSF according to exemplary embodiments.

FIG. 14A-FIG. 14D are schematic diagrams illustrating different scenarios of dynamically controlling data flows of ANDSF according to exemplary embodiments. Referring to FIG. 14A, a MTC network 140 includes a MTC server 11, an EPC 31, a capillary network 33 and a capillary network 34. In the capillary network 33, a MTC gateway 331 may connect MTC local-access devices (such as MTC local-access devices 333, 335, 336) to the MTC server 11 through an eNB 312 of the EPC 31. In the capillary network 34, a MTC gateway 341 may connect MTC local-access devices (such as the MTC local access device 342) to the MTC server 11 through an eNB 311 of the EPC 31.

FIG. 14A illustrates an embodiment of capillary networks with pre-scheduled traffic. For example, MTC local-access devices such as the MTC local access device 335 may be smart meter devices, which are pre-scheduled to submit (uplink transmit) their respective metering data to the MTC server 11 at 12:15 every day. In the capillary network 33, smart meters are pre-scheduled to submit metering data at 14:15 every day. As such, only a part of the data flows (MTC traffic) from the capillary network 33 that occurs at 12:15 is routed over the MTC gateway 331 and the eNB 312; the other part of the MTC traffic from the capillary network 33 is routed over the MTC gateway 341 and the eNB 311 with the positive effect that the load is distributed over two eNBs. It is noted that the policy rules of routing data flows of the MTC local-access devices is updated beforehand by the ANDSF in the EPC 31 to the MTC gateways 331, 341; the MTC gateways 331, 341 form a direct communication link between each other; and the MTC local access device 333 and the MTC local access device 342 form a connection link for the capillary networks 33, 34 (for example, the MTC local-access devices 333, 342 may be ZigBee border gateway devices).

Figure 14B:
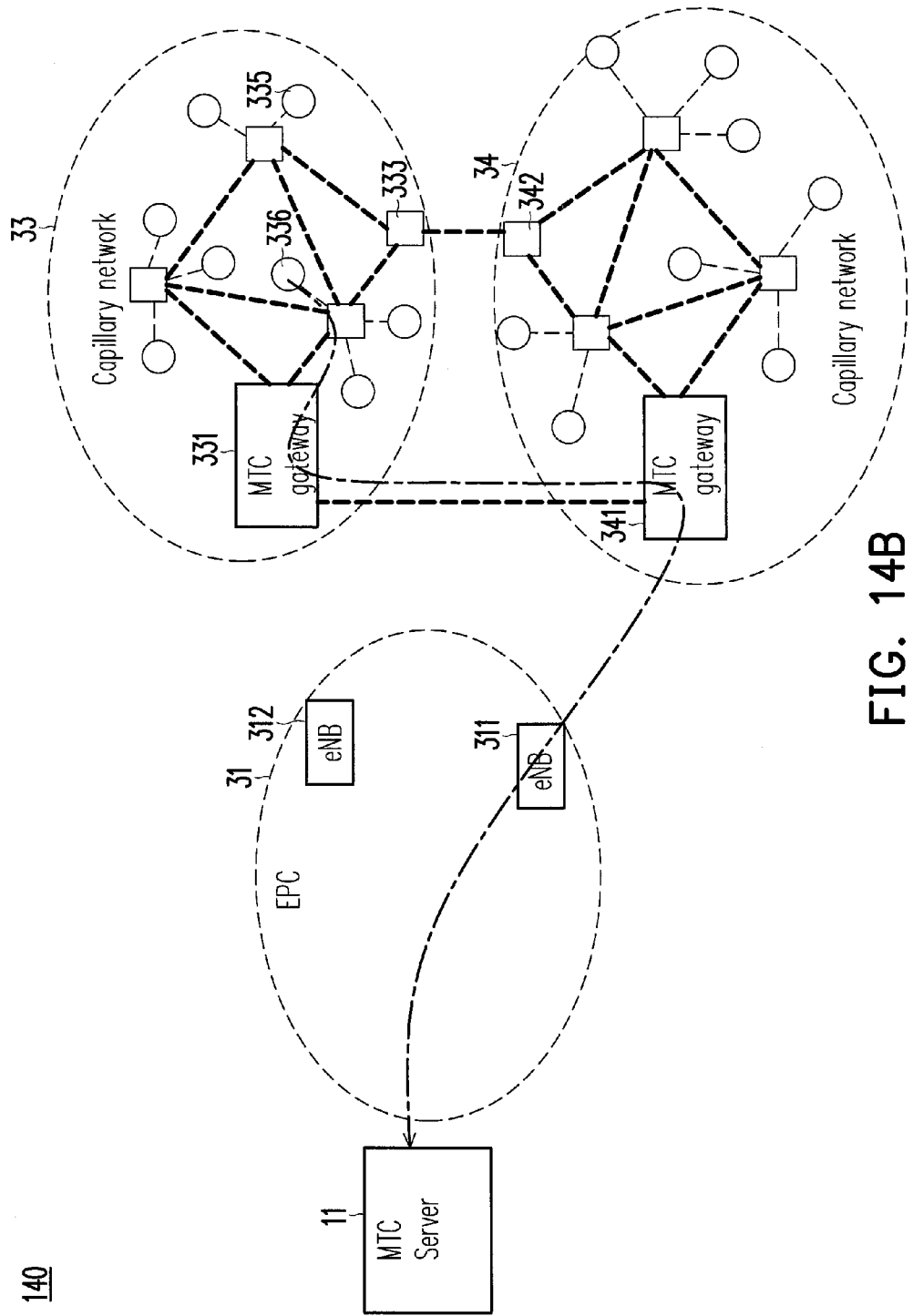

FIG. 14B illustrates an embodiment of capillary networks with different busy hours. Referring to FIG. 14B, the eNB 312 in the present embodiment is located in a commercial area and it is expected that busy hour of the eNB 312 is at 11:00; the eNB 311 is located in a residential area and it is expected that busy hour of the eNB 311 is at 18:00. Therefore, when MTC local-access devices in the capillary network 33 need to transmit MTC data to the MTC server 11 at 11:00, the MTC traffic from the capillary network 33 is routed over the MTC gateway 331, the MTC gateway 341 and the eNB 311 during the busy hour of the eNB 312 at 11:00.

Figure 14C:
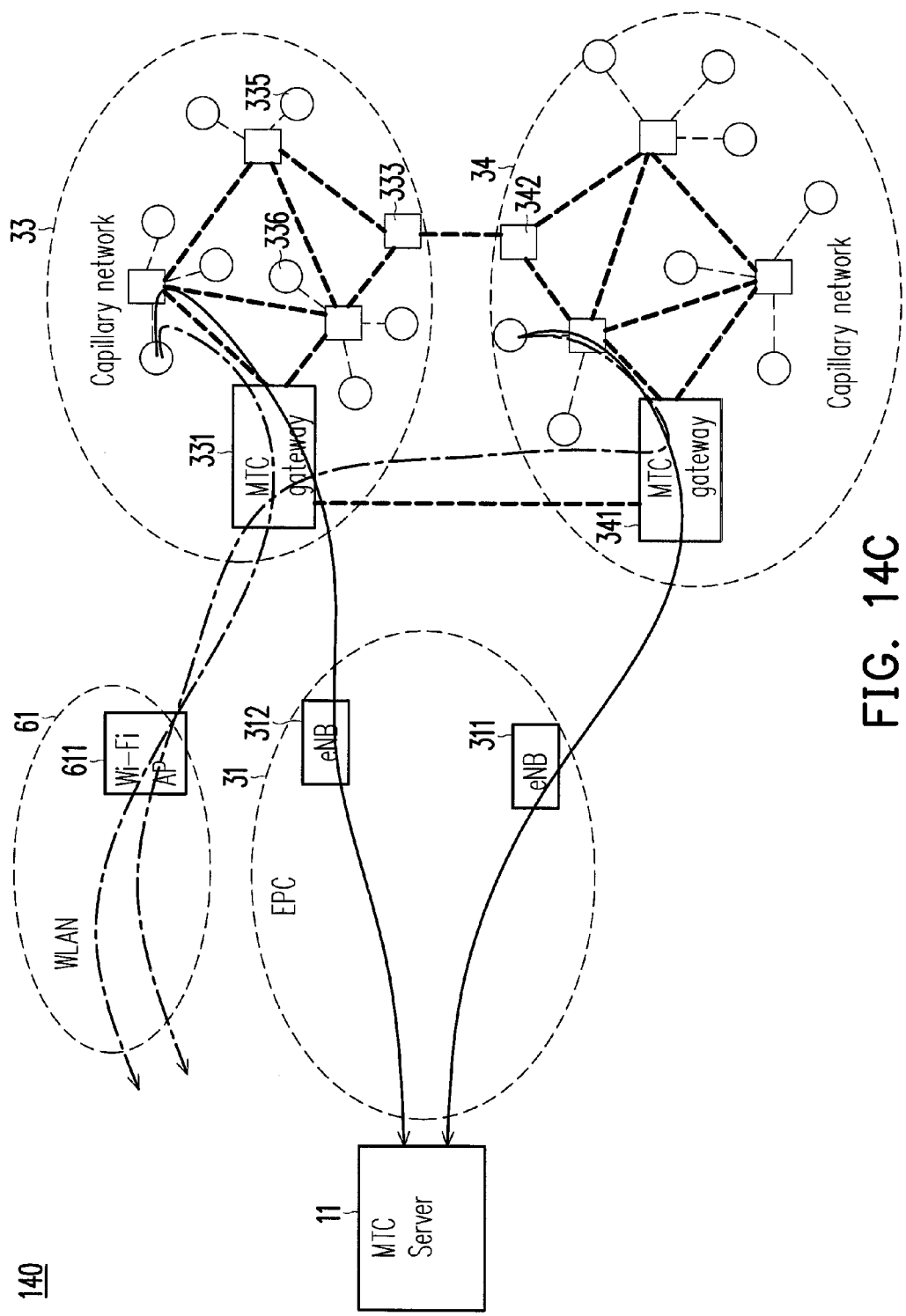

FIG. 14C illustrates an embodiment of capillary networks with temporary backhaul congestion. Referring to FIG. 14C, in the present embodiment, the MTC traffic from the capillary networks 33, 34 to the MTC server 11 are pre-scheduled to be routed over the MTC gateway 331, the MTC gateway 341 and a Wi-Fi AP 611 in a WLAN 61. Such routing may be for offloading. However, the WLAN 61 becomes temporarily and unexpectedly backhaul congested. Thus, the ANDSF (not shown in FIG. 14C) of the MNO in the EPC 31 may transmit new policy rules to the MTC gateways 331, 341, so as to instruct the MTC gateways 331, 341 temporarily stop offloading the MTC traffic from the capillary networks 33, 34 at congestion times, and route the MTC traffic from the capillary networks 33, 34 over 3GPP access (for example, over the eNBs 311, 312) of the access network 11. In FIG. 14C, the dashed line routing paths over the Wi-Fi AP 611 are old routing paths; the solid line routing paths over the eNBs 311, 312 towards the MTC server 11 are new routing paths after the instruction provided from the ANDSF of the EPC 31 to the MTC gateways 331, 341.

Figure 14D:
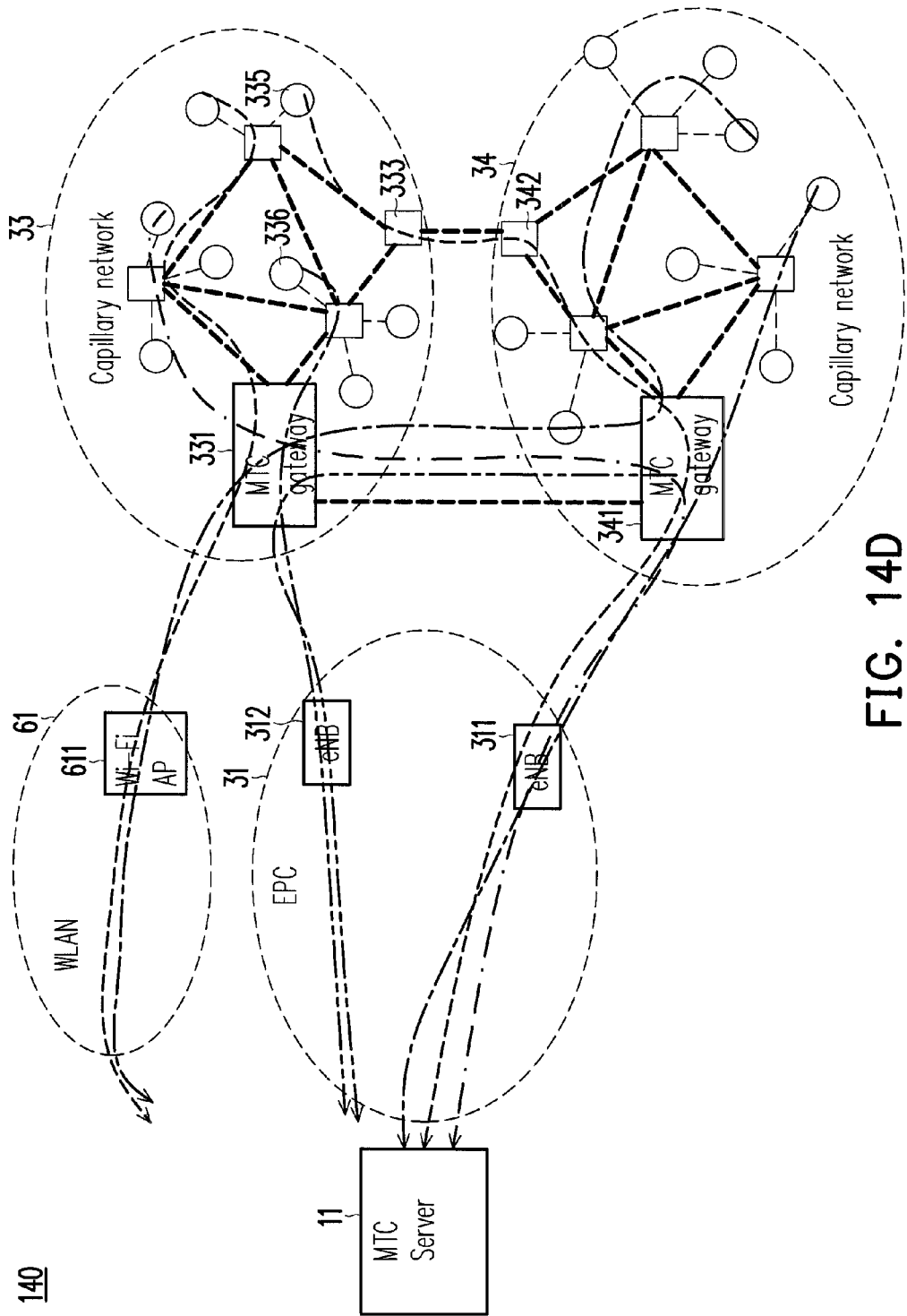

FIG. 14D illustrates an embodiment of capillary networks in which mobile network operator policy controls routing based on traffic types of data flows in the capillary networks. Referring to FIG. 14D, dash line routing paths from MTC local-access devices in the capillary networks 33, 34 to the MTC server 11 over the Wi-Fi AP 611, the eNB 311 or the eNB 312 may refer to MTC traffic with different traffic types. For example, the traffic types may be "file transfer" or "video streaming" as illustrated in Table IV, but may also be "best effort" data flows. In the present embodiment, MTC traffic is routed over different access networks (such as the WLAN 61 or the EPC 31) base on traffic type of the MTC traffic depending upon policy rules configured by the MNO; such policy rules may be stored in the ANDSF in the MNO domain and may be transmitted by the ANDSF to the capillary networks 33, 34.

FIG. 14D shows effects which can be achieved by the method for dynamically controlling data paths proposed in the present embodiment through the interconnected MTC gateways. For example, best effort traffic of the capillary networks 33 and 34 are routed over WLAN 61. In the case of best effort traffic from the capillary network 34, the best effort traffic is utilizing the inter-MTC gateway connection to reach WLAN 61. Similarly, video streaming traffic from the capillary networks 33 and 34 can be routed over the eNB 312. In the case of video streaming traffic from the capillary network 34, the video streaming traffic is utilizing the inter-MTC gateway connection to reach eNB 312 and so like.

From one perspective, the disclosure provides a method to transmit required information to enable inter-MTC gateway routing based on policy rule(s) from at least one MTC server in the MTC service provider domain to the ANDSF in the MNO domain, and the enhanced policy rule(s) generated by the ANDSF may also be transmitted from the ANDSF to the MTC gateways, such that it may enable efficient and effective communication between MTC local-access devices and MTC servers over interconnected MTC gateways in a MTC network.

From another perspective, the present disclosure provides methods for enabling efficient and effective communication between MTC local-access devices in MTC capillary networks and at least one MTC server over interconnected MTC gateways. The proposed methods of efficient and effective communication between MTC local-access devices in the MTC capillary networks and the at least one MTC server may enable a mobile network operator to dynamically control service data flows from the MTC local-access devices in the MTC capillary networks to the at least one MTC server over any of a number of interconnected MTC gateways, where the MTC local-access devices and the MTC gateways are deployed and operated by a MTC service provider. The mobile network operator (MNO) may be unaware of specific information of the capillary network and the MTC gateways, so the present disclosure proposes a method for collecting routing information and topology information which were known only by the MTC service provider. Further, the proposed methods also provide procedures to deliver the collected routing information and topology information of the capillary networks from the at least one MTC server to a network device in the operator domain. The network device may be, for example, the ANDSF (Access Network Discovery and Selection Function) in the core network of the MNO.

In one exemplary embodiment, the information transmitted from the at least one MTC server to the ANDSF and from the ANDSF to all the MTC gateways which are interconnected to each other may be used, for instance, to populate IP stack routing tables to enable a MTC local-access device use a MTC gateway which does not provide coverage for the area where the MTC local-access device is located in. As such, the MTC local-access device may access the MNO through any available access network. Other information not directly related to routing of service data flows and not known to the MNO may also be transmitted from the MTC server to the ANDSF. The information may be, for instance, used by the MNO for proactively setting policy rule(s). A variant of the proposed methods could be applicable for the situation that the at least one MTC server is located in the MNO domain, and controlled by the MNO.

In another exemplary embodiment, communication between MTC local-access devices in MTC capillary networks and at least one MTC servers over interconnected MTC gateways could be transmitting certain information from the MTC service provider domain to the mobile network operator domain. More specifically, transmitting information from at least one MTC server to the ANDSF may be controlled by the MTC service provider. The information may not be only related to the MTC gateways interconnection network. For instance, the MTC service provider may transmit scheduled capillary network peak hour (or pre-scheduled busy periods of a capillary network) to the mobile network operator. Such information would help to set routing policies (or the policy rule(s)) in a proactive manner.

According to an exemplary embodiment, following use case could be described below for dynamically controlling data paths of MTC local access device(s) in MTC networks. A first MTC gateway provides communication between smart meters with metering application in a first capillary network and one or several MTC server(s). The smart meters with metering application are preconfigured (by the MTC service provider) to transmit metering information every day at 12:15 hours. A second MTC gateway provides communication between smart meters with metering application in a second capillary network and one or several MTC server(s). The smart meters with metering application are preconfigured (by the MTC service provider) to transmit metering information every day at 14:15 hours. The first MTC gateway is in the coverage area of a first eNB; and the second MTC gateway B is in the coverage area of a second eNB. Both the first and second MTC gateways are interconnected. If the MNO knew about the busy hours of the first and second capillary networks, the network device of the MNO could proactively set routing policies to route, for example, 50% of the traffic from the first capillary network at 12:15 hours to the first eNB and the other 50% over the second MTC gateway to the second eNB.

In summary, according to the exemplary embodiments of the disclosure, method for dynamically controlling data paths of Machine-type-communication (MTC) local access device(s) are proposed along with a MTC gateway and a network device using the same method. In one embodiment, the proposed method may include a network device receiving and storing capillary network information and MTC gateway interconnection information from at least one MTC server; the network device combining the access network information with the capillary network information and the MTC gateway interconnection information to build an aggregated topology map; the network device generating enhanced policy rules according to the aggregated topology map related to at least one capillary network; and the network device respectively transmitting the enhanced policy rules to the interconnected MTC gateways.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for dynamically controlling data paths, adapted to a machine-type-communication (MTC) network comprising local-access devices, MTC gateways, at least one MTC server and a network device, the method comprising:
    the network device receiving capillary network information of MTC capillary networks and MTC gateway interconnection information of the MTC gateways either directly over a control plane from the at least one MTC server, or indirectly receiving the capillary network information and the MTC gateway interconnection information transmitted from the at least one MTC server to one of the MTC gateways over a user plane and then from the one of the MTC gateways to the network device over a S14 interface,
    wherein the MTC network comprises the MTC capillary networks, at least one mobile network operator domain, the MTC gateways and the at least one MTC server,
    wherein the mobile network operator domain comprises a core network and an access network, the mobile network operator domain comprises the network device, and part of the local-access devices connected to the MTC gateways such that the MTC capillary networks are connected to the mobile network operator domain through the MTC gateways,
    wherein the MTC capillary networks comprise the local-access devices which are MTC local-access devices, the local-access devices are located in the MTC capillary networks, the MTC gateways are interconnected with each other, the network device is located in the mobile network operator domain, and the network device is Access Network Discovery and Selection Function,
    wherein the capillary network information comprises busy hours of the MTC capillary networks and inter-capillary network connection, and the MTC gateway interconnection information comprise MTC gateway interconnection topology and MTC gateway interconnection characteristics;

the network device storing the capillary network information and the MTC gateway interconnection information;

the network device receiving access network information of the access network from the mobile network operator domain, wherein the access network information comprises current load situation of at least one base station of the access network;

the network device combining a access network topology of the access network information with the capillary network information and a MTC gateway interconnection topology of the MTC gateway interconnection information to build an aggregated topology map related to the MTC capillary networks;

the network device processing the aggregated topology map related to the MTC capillary networks, and then generating enhanced policy rules, wherein the network device modifies pre-configured policy rules or create new policy rules to generate the enhanced policy rules, and the enhanced policy rules includes routing tables of data flow packets from the local-access devices to the MTC server; and the network device respectively transmitting the enhanced policy rules to the interconnected MTC gateways.

2. The method for dynamically controlling data paths of claim 1, wherein the MTC capillary networks are respectively connected to the interconnected MTC gateways.

3. The method for dynamically controlling data paths of claim 1, wherein at least two neighboring MTC capillary networks among the MTC capillary networks are bridged together through the interconnected MTC gateways.

4. The method for dynamically controlling data paths of claim 1, wherein the step of receiving the capillary network information and the MTC gateway interconnection information from the at least one MTC server comprises:

the network device receiving the MTC gateway interconnection topology and scheduled capillary network busy periods and other capillary network properties from the at least one MTC server.

5. The method for dynamically controlling data paths of claim 1, wherein the step of receiving the capillary network information and the MTC gateway interconnection information from the at least one MTC server comprises:

the network device receiving types of MTC traffic originated from the MTC capillary networks, traffic priority of the MTC traffic, and traffic volume of the MTC traffic from the at least one MTC server.

6. The method for dynamically controlling data paths of claim 1, wherein the step of receiving access network information from the mobile network operator domain comprises:

receiving the current load situation of the at least one base station of the access network in the mobile network operator domain.

7. The method for dynamically controlling data paths of claim 1, wherein the step of respectively transmitting the enhanced policy rules to the interconnected MTC gateways comprises:

the network device respectively establishing secure link with the interconnected MTC gateways; and the network device respectively transmitting the enhanced policy rules and a routing table related to the interconnected MTC gateways and the MTC capillary networks.

8. The method for dynamically controlling data paths of claim 1, further comprising:

the network device receiving other information relevant to policy rules related to MTC traffic originated from the MTC capillary networks;

the network device storing the other information relevant to policy rules related to MTC traffic; and the network device combining the other information relevant to policy rules related to MTC traffic, the access network information with the capillary network information and the MTC gateway interconnection information to build the aggregated topology map.

9. The method for dynamically controlling data paths of claim 1, wherein the step of receiving capillary network information and MTC gateway interconnection information from the at least one MTC server comprises:

the network device receiving the capillary network information and MTC gateway interconnection information from the at least one MTC server through some of the interconnected MTC gateways.

10. The method for dynamically controlling data paths of claim 1, wherein the enhanced policy rules comprise an Intersystem routing policy (ISRP) table for each one of the interconnected MTC gateways, wherein the ISRP table comprises traffic descriptions, preferred radios and forbidden radios.

11. The method for dynamically controlling data paths of claim 10, wherein the ISRP table further comprises routing criteria configured for at least one MTC gateway of the interconnected MTC gateways.

12. A method for dynamically controlling data paths, adapted to a machine-type-communication (MTC) network comprising local-access devices, MTC gateways, at least one MTC server and a network device, the method comprising:

the at least one MTC server transmitting capillary network information of MTC capillary network and MTC gateway interconnection information of the MTC gateways over a user plane to the interconnected MTC gateways, so that the interconnected MTC gateways then transmit the capillary network information of the MTC capillary networks and the MTC gateway interconnection information to the network device over a S14 interface, wherein the MTC network comprises the MTC capillary networks, at least one mobile network operator domain, the MTC gateways and the at least one MTC server, wherein the mobile network operator domain comprises a core network and an access network, the mobile network operator domain comprises the network device, and part of the local-access devices are connected to the MTC gateways such that the MTC capillary networks are connected to the mobile network operator domain through the MTC gateways, wherein the MTC capillary networks comprise the local-access devices which are MTC local-access devices, the local-access devices are located in the MTC capillary networks, the MTC gateways are interconnected with each other, the network device is located in the mobile network operator domain, and the network device is Access Network Discovery and Selection Function, wherein the capillary network information comprises busy hours of the MTC capillary network and inter-capillary network connection, and the MTC gateway interconnection information comprise MTC gateway interconnection topology and MTC gateway interconnection characteristics.

13. The method for dynamically controlling data paths of claim 12, wherein the MTC capillary networks are respectively connected to the interconnected MTC gateways.

14. The method for dynamically controlling data paths of claim 12, wherein at least two neighboring capillary networks among the MTC capillary networks are bridged together through the interconnected MTC gateways.

15. A method for dynamically controlling data paths, adapted to a machine-type-communication (MTC) server in a MTC network comprising local-access devices, MTC gateways, at least one MTC server and a network device, the method comprising:

the at least one MTC server receiving enhanced policy rules from the network device, wherein the enhanced policy rules are related to data flows of at least one MTC device in a capillary network in MTC capillary networks, wherein the MTC server sends capillary network information of MTC capillary networks and MTC gateway interconnection information of the MTC gateways to the network device either directly over a control plane, or indirectly to one of the MTC gateway over a user plane and the one of the MTC gateway sends it to the network device over a S14 interface, wherein the MTC network comprises the MTC capillary networks, at least one mobile network operator domain, the MTC gateways and the at least one MTC server, wherein the mobile network operator domain comprises a core network and an access network, the mobile network operator domain comprises the network device, and part of the local-access devices are connected to the MTC gateways such that the MTC capillary networks are connected to the mobile network operator domain through the MTC gateways, wherein the MTC capillary networks comprise the local-access devices which are MTC local-access devices, the local-access devices are located in the MTC capillary networks, the MTC gateways are interconnected with each other, the network device is located in the mobile network operator domain, and the network device is Access Network Discovery and Selection Function, wherein the capillary network information comprises busy hours of the MTC capillary network and inter-capillary network connection, and the MTC gateway interconnection information comprise MTC gateway interconnection topology and MTC gateway interconnection characteristics, wherein the network device receives access network information of the access network from the mobile network operator domain, the network device combines a network topology of the access network information with the capillary network information and the MTC gateway interconnection topology of the MTC gateway interconnection information to build an aggregated topology map related to the MTC capillary networks, and the network device processes the aggregated topology map related to the MTC capillary networks then generates the enhanced policy rules, wherein the network device modifies pre-configured policy rules or create new policy rules to generate the enhanced policy rules, and the enhanced policy rules includes routing tables of data flow packets from the local-access devices to the MTC server;

the at least one MTC server storing the enhanced policy rules; and the at least one MTC server updating its routing table in accordance with the enhanced policy rules.

16. The method for dynamically controlling data paths of claim 15, wherein the MTC capillary networks are respectively connected to the interconnected MTC gateways.

17. The method for dynamically controlling data paths of claim 15 wherein at least two neighboring capillary networks among the MTC capillary networks are bridged together through the interconnected MTC gateways.

18. A method for dynamically controlling data paths, adapted to a machine-type-communication (MTC) server in a MTC network comprising local-access devices, MTC gateways, at least one MTC server and a network device, the method comprising:

the at least one MTC server provisioning capillary network information of MTC capillary network and MTC gateway interconnection information of the MTC gateways to a mobile network operator entity over a control plane, wherein the MTC network comprises the MTC capillary networks, at least one mobile network operator domain, the MTC gateways and the at least one MTC server, wherein the mobile network operator domain comprises a core network and an access network, the mobile network operator domain comprises the network device, and part of the local-access devices are connected to the MTC gateways such that the MTC capillary networks are connected to the mobile network operator domain through the MTC gateways, wherein the MTC capillary networks comprise the local-access devices which are MTC local-access devices, the local-access devices are located in the MTC capillary networks, the MTC gateways are interconnected with each other, the network device is located in the mobile network operator domain, and the network device is Access Network Discovery and Selection Function, wherein the capillary network information comprises busy hours of the MTC capillary network and inter-capillary network connection, and the MTC gateway interconnection information comprise MTC gateway interconnection topology and MTC gateway interconnection characteristics; and the mobile network operator entity transmitting the capillary network information and the MTC gateway interconnection information to the network device over the control plane.

19. The method for dynamically controlling data paths of claim 18, wherein the MTC capillary networks are respectively connected to the interconnected MTC gateways.

20. The method for dynamically controlling data paths of claim 19, wherein at least two neighboring capillary networks among the MTC capillary networks are bridged together through the interconnected MTC gateways.

21. The method for dynamically controlling data paths of claim 18, wherein the mobile network operator entity is a MTC inter-working function.

* * * * *